United States Patent
Silke et al.

(10) Patent No.: US 10,239,217 B2
(45) Date of Patent: Mar. 26, 2019

(54) MAGNET GRIPPER SYSTEMS

(71) Applicant: GENERAL ATOMICS, San Diego, CA (US)

(72) Inventors: Gerald William Silke, El Cajon, CA (US); Michael Bernard Condon, Poway, CA (US)

(73) Assignee: General Atomics, San Diego, CA (US)

( * ) Notice: Subject to any disclaimer, the term of this patent is extended or adjusted under 35 U.S.C. 154(b) by 351 days.

(21) Appl. No.: 15/013,909

(22) Filed: Feb. 2, 2016

(65) Prior Publication Data

US 2017/0222506 A1 Aug. 3, 2017

(51) Int. Cl.
*B25J 15/06* (2006.01)
*H02K 1/18* (2006.01)
*H02K 1/27* (2006.01)
*H02K 1/14* (2006.01)
*H02K 1/24* (2006.01)
*B25J 15/04* (2006.01)
(Continued)

(52) U.S. Cl.
CPC ......... *B25J 15/0608* (2013.01); *B25J 15/026* (2013.01); *B25J 15/0475* (2013.01); *B25J 15/08* (2013.01); *H02K 1/146* (2013.01); *H02K 1/18* (2013.01); *H02K 1/24* (2013.01); *H02K 1/276* (2013.01); *H02K 1/2706* (2013.01); *Y10T 29/53196* (2015.01)

(58) Field of Classification Search
CPC H02K 3/18; H02K 1/146; H02K 1/24; H02K 1/2706; H02K 1/18; H02K 1/276; B25J 15/026; B25J 15/0475; B25J 15/0608; B25J 15/08; Y10T 29/53196
See application file for complete search history.

(56) References Cited

U.S. PATENT DOCUMENTS 4,839,961 A 6/1989 Adrianus
5,691,589 A 11/1997 Keim
(Continued)

FOREIGN PATENT DOCUMENTS

JP 2012206215 A * 10/2012
KR 20130023968 3/2013
(Continued)

OTHER PUBLICATIONS

International Search Report and Written Opinion of the International Searching Authority for PCT Application No. PCT/US2016/053735 dated Jan. 12, 2017.

*Primary Examiner* — A. Dexter Tugbang
(74) *Attorney, Agent, or Firm* — Fitch, Even, Tabin & Flannery LLP

(57) ABSTRACT

Some embodiments provide a magnet gripper system, comprising: a gripper base comprising a magnetically attractive face; at least two slide plate retaining systems; and two or more slide plates wherein at least one of the slide plates is movably cooperated with each of the at least two slide plate retaining systems such that the slide plates are configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position.

26 Claims, 18 Drawing Sheets

(51) Int. Cl.
*B25J 15/02* (2006.01)
*B25J 15/08* (2006.01)

(56) References Cited

U.S. PATENT DOCUMENTS

| | | |
|---|---|---|
| 6,933,645 B1 | 8/2005 | Watson |
| 7,569,968 B2 | 8/2009 | Nakamura |
| 7,882,613 B2 | 2/2011 | Barthelmie |
| 8,225,497 B2 | 7/2012 | Johnson |
| 8,368,274 B2 | 2/2013 | Yoshizawa |
| 8,664,819 B2 | 3/2014 | Piercey |
| 2006/0175852 A1* | 8/2006 | Sotome ............ B25J 15/026 294/207 |
| 2006/0225270 A1* | 10/2006 | Wong ............ Y10T 29/53196 29/739 |
| 2007/0051718 A1 | 3/2007 | Schmitt |
| 2013/0020820 A1* | 1/2013 | Bieler ............ B25J 15/026 294/119.1 |
| 2013/0099617 A1 | 4/2013 | Chamberlin |
| 2014/0020814 A1 | 1/2014 | Druke |
| 2014/0042858 A1 | 2/2014 | Tsuchiya |

FOREIGN PATENT DOCUMENTS

| | | |
|---|---|---|
| WO | 2015008058 | 1/2015 |
| WO | 2015058840 | 4/2015 |

* cited by examiner

MAGNET GRIPPER SYSTEMS

BACKGROUND

1. Field of the Invention

The present invention relates generally to rotors.

2. Discussion of the Related Art

Rotors are utilized in many different types of devices. Further, there are many different types and sizes of rotors. Typically, rotors include multiple magnets positioned on and about the rotor. The assembly of rotors with numerous magnets can be difficult, particularly when using high strength magnets.

SUMMARY OF THE INVENTION

In some embodiments, apparatuses and methods are provided herein useful in assembling a rotor system. Some embodiments provide a magnet gripper system, comprising: a gripper base comprising a magnetically attractive face; at least two slide plate retaining systems rigidly fixed relative to the gripper base positioned on lateral sides relative to the gripper base and separated by at least a width of the gripper base; and two or more slide plates wherein at least one of the slide plates is movably cooperated with each of the at least two slide plate retaining systems such that the slide plates are configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position.

Further, some embodiments provide methods of assembling a rotor, comprising: positioning a magnet gripper system adjacent a magnet; moving the magnet gripper system such that the magnet is magnetically cooperated with a gripper base of the magnet gripper system; and sliding at least two rigid slide plates, slidably secured with the gripper base of the magnet gripper system, along opposite lateral sides of the magnet such that the slide plates in cooperation with the magnetic attraction between the magnet and the gripper base maintains a position of the magnet relative to the gripper base. Additionally, some embodiments in detaching the magnet from the magnet gripper system slide the at least two rigid slide plates along the lateral sides of the magnet to a retracted position, and extend one or more push rods such that non-magnetically attractive ends contact the magnet and push the magnet away from the gripper base overcoming the magnetic attraction between the magnet and the gripper base.

Some implementations provide a rotor assembly system comprising: a magnet gripper system comprising: a gripper base comprising a magnetically attractive face; two or more slide plates configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position; and an axial clamp system comprising: an axial restraint ring comprising two or more ring restraint segments that physically secure together forming a hollow ring and configured to be positioned about a first series of magnets positioned on an exterior surface of a rotor core; wherein each ring restraint segment comprises one or more flanges comprising an interior surface facing toward an interior of the hollow ring when the two or more ring restraint segments are cooperated, and configured to contact a lateral side of one or more of the first series of magnets.

Still further, some embodiments provide an apparatus maintaining magnet positioning during rotor assembly, comprising: an axial restraint ring comprising: two or more ring restraint segments that physically secure together forming a hollow ring and configured to be positioned about a first series of magnets positioned on an exterior surface of a rotor core; each ring restraint segment comprises a body, one or more shoulders extending from the body, and one or more flanges extending at an angle from an end of each of the one or more shoulders, wherein each of the one or more flanges comprise an interior surface, facing toward an interior of the hollow ring when the two or more ring restraint segments are cooperated, and configured to contact an end of one or more of the magnets of the first series of magnets; and a plurality of axial drivers, wherein each of the plurality of axial drivers cooperates with the body of one of the two or more ring restraint segments and extend away from the corresponding ring restraint segment to cooperate with one or more anchors.

In some implementations, methods of assembling a rotor are provided. Some of these methods, comprise: temporarily positioning an axial restraint ring on and about a first series of magnets positioned on an exterior surface of a rotor core, wherein the axial restraint ring comprises two or more ring restraint segments each comprising a body, one or more shoulders extending from each of the bodies, and one or more flanges extending at an angle from an end of each of the one or more shoulders, wherein each of the one or more flanges comprise an interior surface facing toward an interior of the hollow ring, wherein the temporarily positioning of the axial restraint ring comprises positioning the axial restraint ring such that the interior surface of each of the one or more flanges is in contact with an end of one or more magnets of the first series of magnets; cooperating a plurality of axial drivers with the axial restraint ring; and activating the plurality of axial drivers and inducing an axial force on the ring restraint segments parallel with the central axis of the hollow ring and a longitudinal axis of the rotor core, such that the axial force applied by the interior surfaces of the one or more flanges onto the ends of each of the magnets of the first series of magnets in at least temporarily maintaining an axial position of each of the magnets of the first series of magnets.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
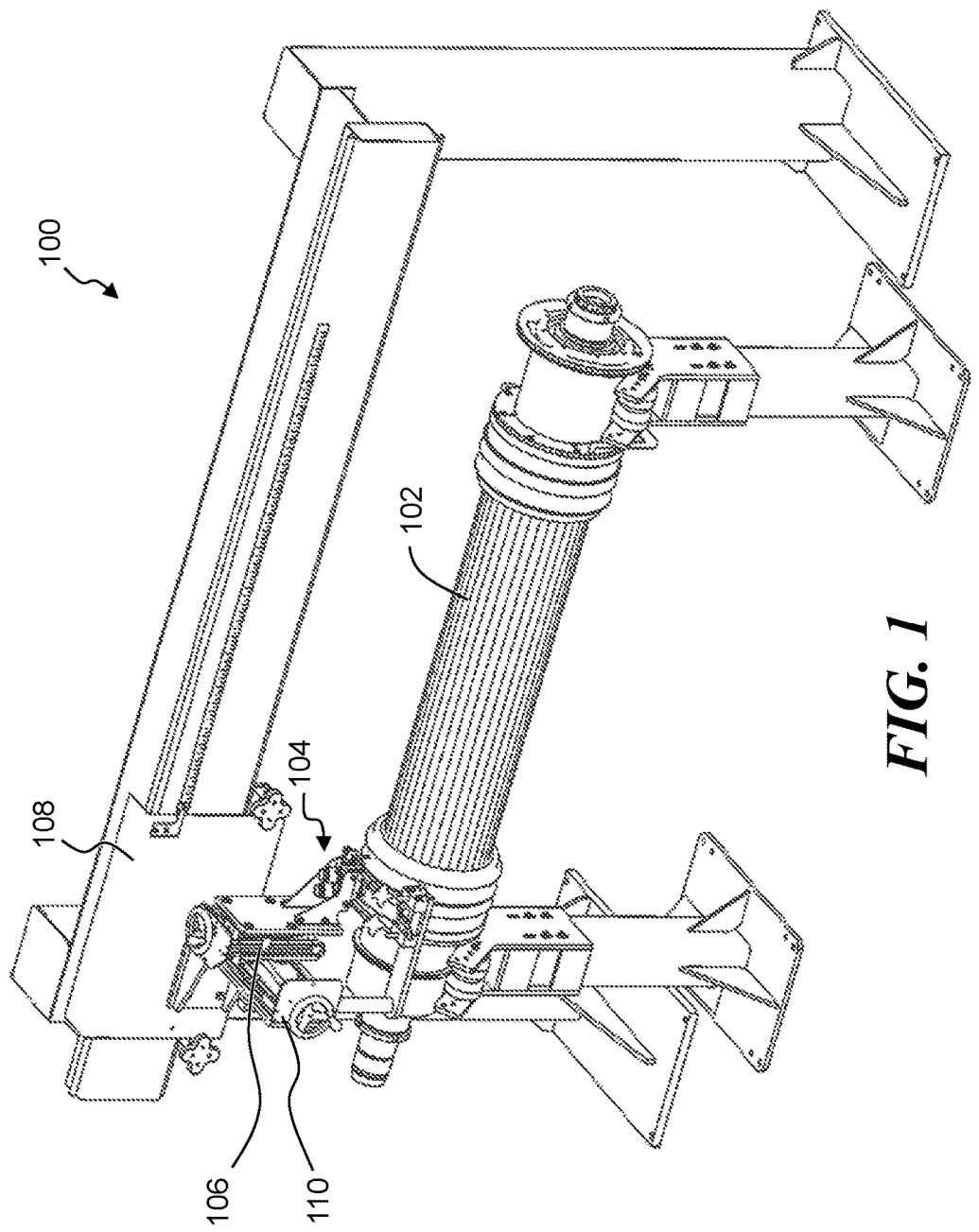
FIG. 1 illustrates a simplified perspective view of an exemplary rotor assembly system positioned relative to a rotor core upon which magnets are to be placed, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Numerous machines, generators, motors and the like incorporate magnetic rotors. The assembly of relatively large rotors with numerous magnets positioned on and about an exterior of a rotor core can be difficult due in part to the precise placement of the magnets, the often magnetic attraction of a magnet to a rotor core as it is placed on the rotor core, the magnetic forces on magnets as they are being placed caused by other magnets already placed on the rotor, and other such factors. Accordingly, some embodiments provide systems, and methods of assembling a rotor. These systems and methods can be utilized with substantially any relevant sized rotor, and substantially any sized magnet to be cooperated onto a rotor core.

FIG. 1 illustrates a simplified perspective view of an exemplary rotor assembly system 100 positioned relative to a rotor core 102 upon which magnets are to be placed, in accordance with some embodiments. The rotor assembly system includes a magnet gripper system 104 cooperated with a vertical positioning slide system 106 and a longitudinal slide system 108. The vertical positioning slide system 106 enables the controlled movement of the magnet gripper along a first axis toward and away from the rotor core 102, such as in a vertical movement and generally perpendicular from a longitudinal or rotational axis of the rotor core. Some implementations include a cross slide system 110 further allowing for the controlled movement of the magnet gripper system 104 at least along a second axis that is generally perpendicular with the longitudinal or rotational axis of the rotor core 102, and perpendicular to the first axis of movement provided by the vertical positioning slide system. The longitudinal slide system 108 allows for the controlled motion of the magnet gripper system in at least a second direction that typically is parallel with the longitudinal or rotational axis of the rotor core 102. As such, some embodiments provide a three axis mechanical slide mechanism for accurately positioning the magnet gripper system over installation locations on the rotor core.

The rotor assembly system is configured to allow magnets to be cooperated with the magnet gripper system 104, moved to a desired position relative to the rotor core 102, and precisely placed onto the rotor core. This process can be repeated any number of times to complete the cooperation of an array of the desired number of magnets with the rotor core. The number of magnets placed on the rotor core is typically dependent on sizes of magnets (and spacers or other structures if relevant that may be cooperated on the rotor core) and the circumference of the rotor core or at least a portion of the rotor core receiving magnets.

Figure 2:
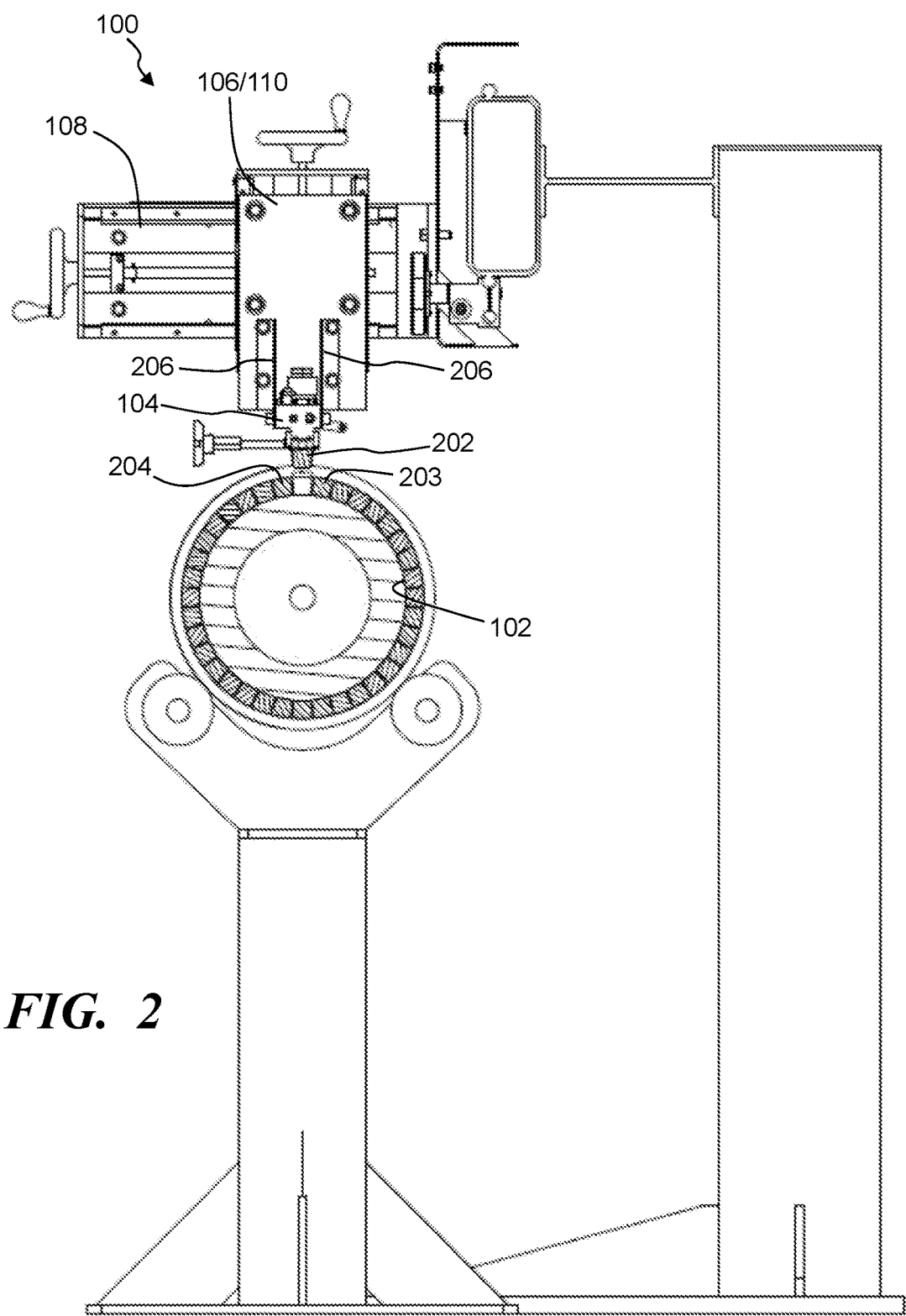
FIG. 2 illustrates a simplified cross-sectional view of a rotor core with the magnet gripper system positioned to place a magnet onto an exterior surface of the rotor core, in accordance with some embodiments.

FIG. 2 illustrates a simplified cross-sectional view of a rotor core 102 with the magnet gripper system 104 positioned to place a magnet 202 onto an exterior surface of the rotor core, in accordance with some embodiments. The magnet 202 is being placed between two other magnets 203, 204 of an array of magnets cooperated about an exterior circumference of the rotor core. In some implementations, the rotor core is supported to allow rotation of the rotor core to align the position of the rotor core where the magnet 202 is to be placed.

Figure 3:
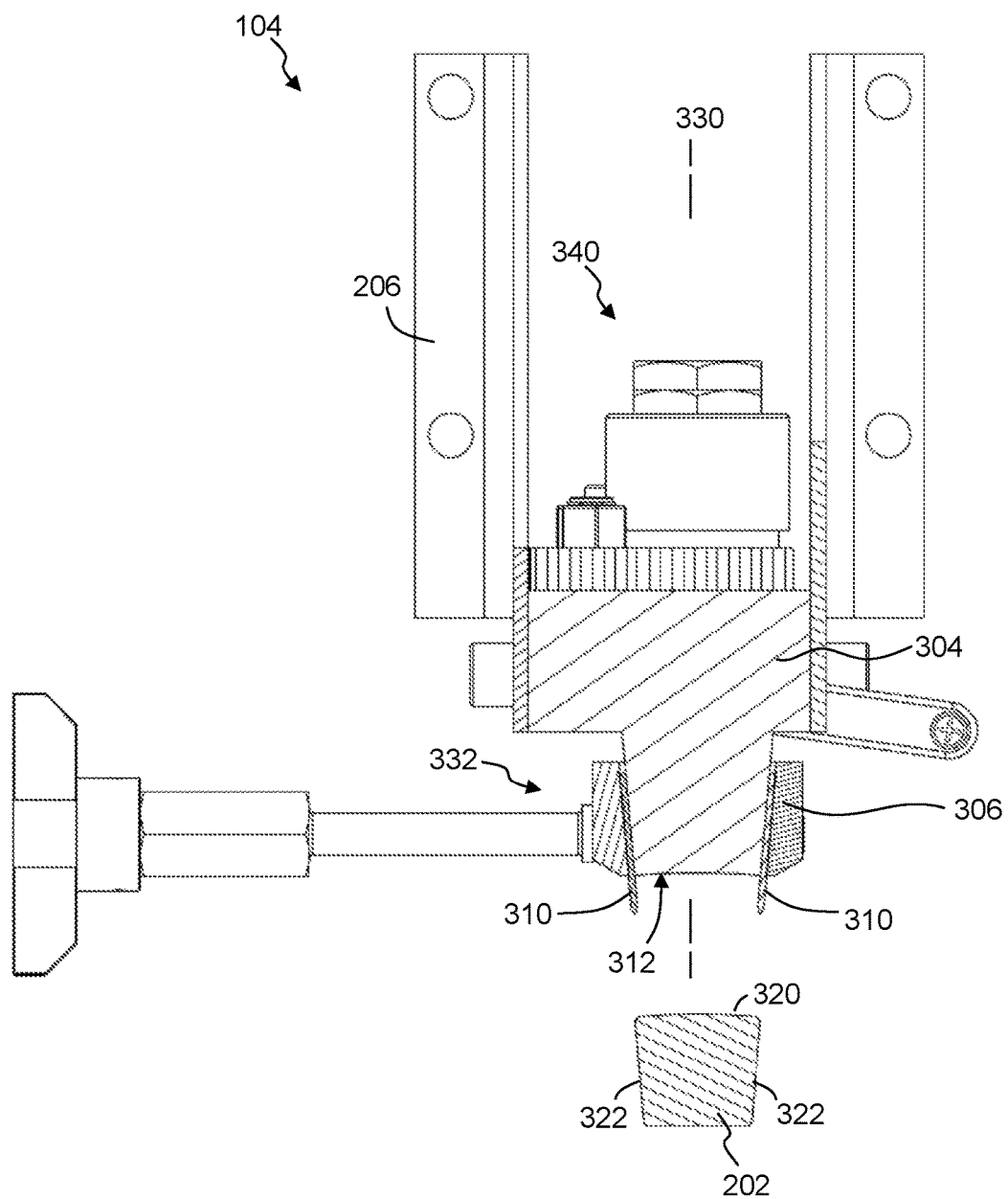
FIG. 3 illustrates a simplified side view of an exemplary magnet gripper system, in accordance with some embodiments.
Figure 4:
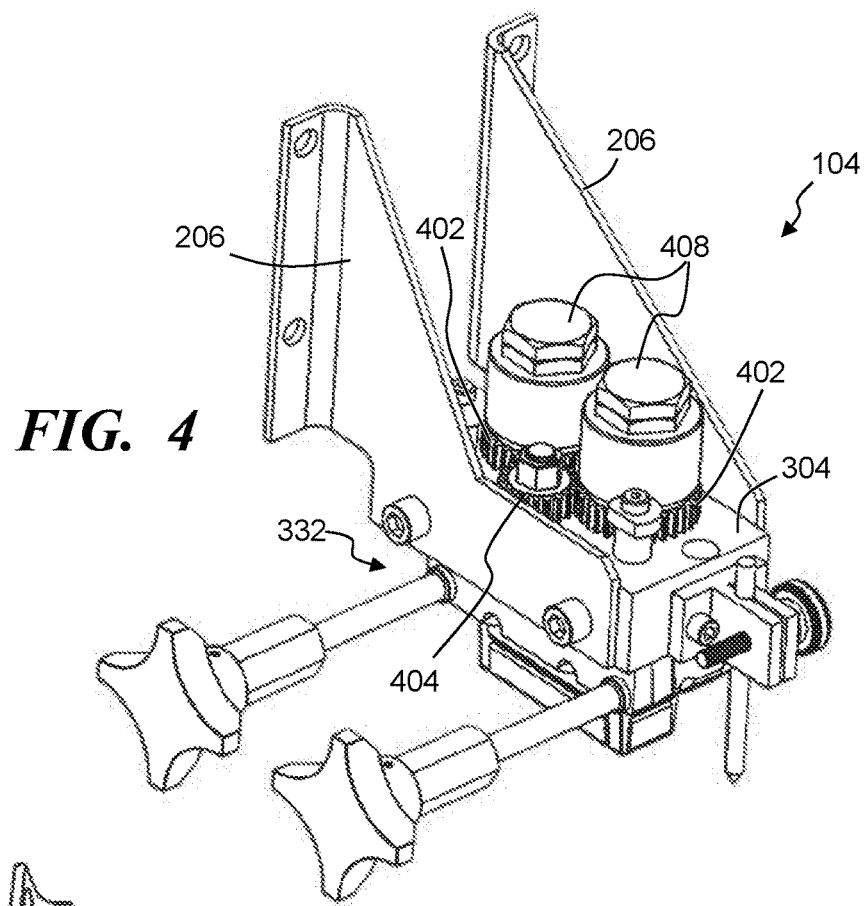
FIG. 4 illustrates a simplified perspective view of an exemplary magnet gripper system cooperated with one or more frames, in accordance with some embodiments.
Figure 5:
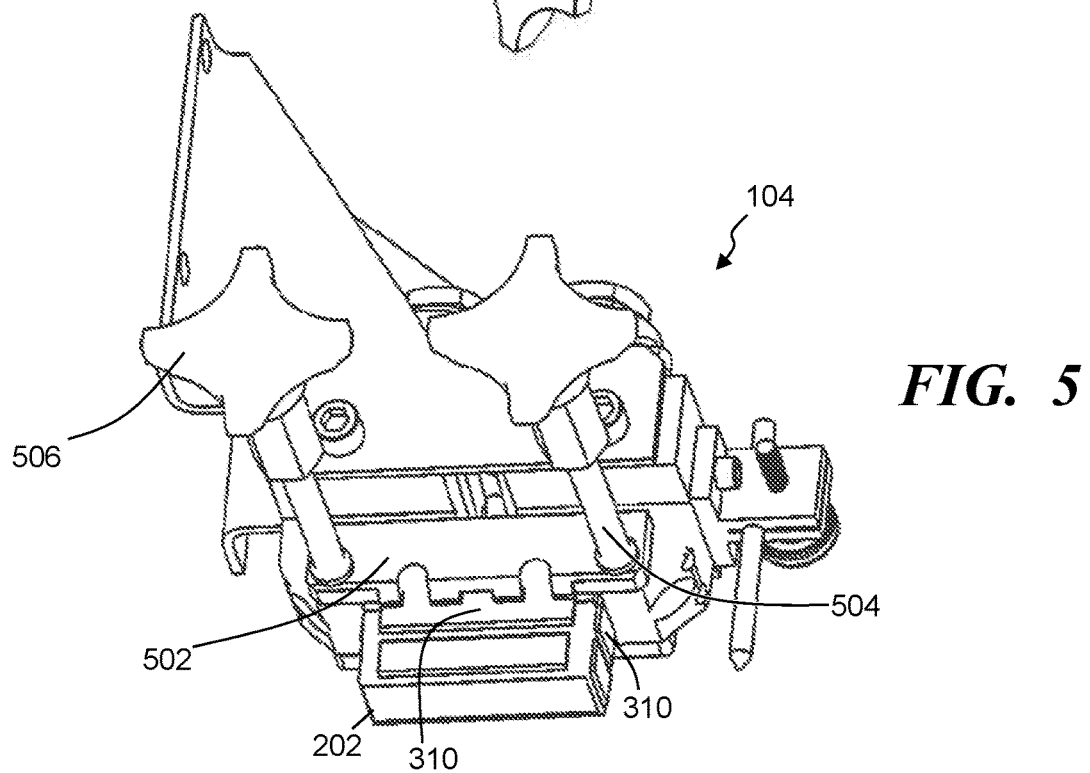
FIG. 5 illustrates a lower perspective view of the exemplary magnet gripper system of FIG. 4.

FIG. 3 illustrates a simplified side view of an exemplary magnet gripper system 104, in accordance with some embodiments, relative to an exemplary magnet 202. In some embodiments, the magnet gripper system includes a gripper base 304, two or more slide plate retaining systems 306, and two or more slide plates 310. The gripper base is typically further secured with one or more frames 206 that secures the magnet gripper system with the one or more slide systems 106, 108, and maintains a stability of the magnet gripper system. In some instances the slide systems can be locked to prevent movement of the magnet gripper system once positioned in a desired location. FIG. 4 illustrates a simplified perspective view of an exemplary magnet gripper system 104 cooperated with one or more frames 206, in accordance with some embodiments. FIG. 5 illustrates a lower perspective view of the exemplary magnet gripper system 104 of FIG. 4.

Referring to FIGS. 3-5, the magnet gripper system is configured to retain and hold a magnet while being positioned on the rotor core. The gripper base is constructed of material that can withstand the expected magnetic forces. Typically, when the magnet is cooperated with the magnet gripper system the magnet contacts a face 312 of the base. In some implementations the gripper base 304 includes a magnetically attractive face 312. Further, in some applications, some or all of the gripper base is magnetically attractive. The gripper base can have substantially any shape, and can depend on an expected implementation. For example, in some embodiments, the gripper base tapers from an upper area to the face 312 allowing a narrower profile proximate the face 312. Further, in some embodiments, the face can be configured with a desired shape. In instances, the shape of the face can depend on and/or correspond to a shape of a magnet 202 intended to be gripped and/or a shape of a surface 320 of the magnet. The mating surface 312 of the gripper base can be machined to match the magnet contour of the magnet. For example, in some instances, the surface 320 of the magnet may have a curvature so that when cooperated with an array of other magnets on the exterior surface of the rotor core the array provides a relatively circular surface about the circumference of the rotor assembly. Accordingly, the face 312, in some implementations, has a curvature that corresponds with and/or matches a curvature of the surface 320 of the magnet.

The two or more slide plate retaining systems 306 are arranged proximate the gripper base, and in some embodiments are rigidly fixed to the gripper base 304 and/or frame 206. The slide plate retaining systems are positioned on lateral sides of the gripper base. Further, in some applications, two of the slide plate retaining systems are separated by at least a width of the gripper base. At least one of the slide plates 310 is movably cooperated with each of the slide plate retaining systems 306 such that the slide plates are configured to move between a retracted position with the slide plates retracted relative to the face 312 of the gripper base 304 and an extended position with the slide plates extended relative to the face 312 of the gripper base such that an end of each of the slide plates is positioned further from the face 312 of the gripper base 304 when in the extended position than when the slide plates are in the retracted position. Although FIG. 3 shows two slide plates 310, other embodiments may include more than two slide plates. For example, when the gripper base has a generally rectangular shape, a slide plate can be positioned along each side such that there are at least four slide plates, one to each side. In some implementations, one or more fixed plates may additionally be included. For example, fixed plates may be rigidly secured to cooperate with ends of a rectangular magnet while one or more slide plates are provided to slidably engage each of the other two sides of the magnet.

The slide plate retaining systems are configured to orient the slide plates relative to the magnet 202 when the magnet is positioned against the gripper base 304 and intended to be retained or gripped by the magnet gripper system. In some embodiments, the slide plate retaining systems further position the slide plates with at least two slide plates spaced apart when in the extended position and each configured to extend along opposite lateral sides 322 of a magnet 202 when the magnet is cooperated with the gripper base.

Accordingly, in some embodiments, the slide plate retaining systems 306 can be configured to allow the slide plates to slide to the extended position and be consistent with the exterior shape of the sides of the magnets intended to be gripped. Further, the slide plate retaining systems can support and retain the slide plates and allow the slide plates to slide between the retracted position and the extended position at an angle relative to a cross-sectional axis 330 of the gripper base 304. For example, the slide plate retaining systems can retain the slide plates such that the slide plates slide at an angle toward each other when moved toward the extended position such that ends of the slide plates distal from the slide plate retraining systems are closer together when in the extended position than when the slide plates are in a retracted position, and provides positive grip forces on a magnet to prevent release.

Further, in some implementations, the magnet gripper system includes one or more slide plate clamp systems 332 secured relative to and/or with the gripper base. In other implementations, the slide plate clamp systems may be secured with the frame 206, slide plate retaining system, 306 or other portion of the magnet gripper system while being positioned to apply a clamping force on one or more of the slide plates. The clamp systems are configured to transitions between a release state and a clamping state. When in the clamping state, the slide plate clamp system induces a compression force on one or more of the slide plates 310 in a direction toward the gripper base 304 and/or frame pinning the slide plates in position and inhibiting movement of the slide plates, and when in the release state releases the compression force and allows movement of the slide plates. For example, in some implementations one or more threaded bolts extend through or by the gripper base and when tightened induce a clamping force on the slide plates forcing the slide plates against lateral sides 322 of the magnet 202 inhibiting at least lateral movements of the slide plates away from the gripper base, and typically further inhibiting extension and retraction movement of the slide plates, and in some instances when needed, can provide adequate grip force to extract a magnet already attached to the rotor core.

Figure 6:
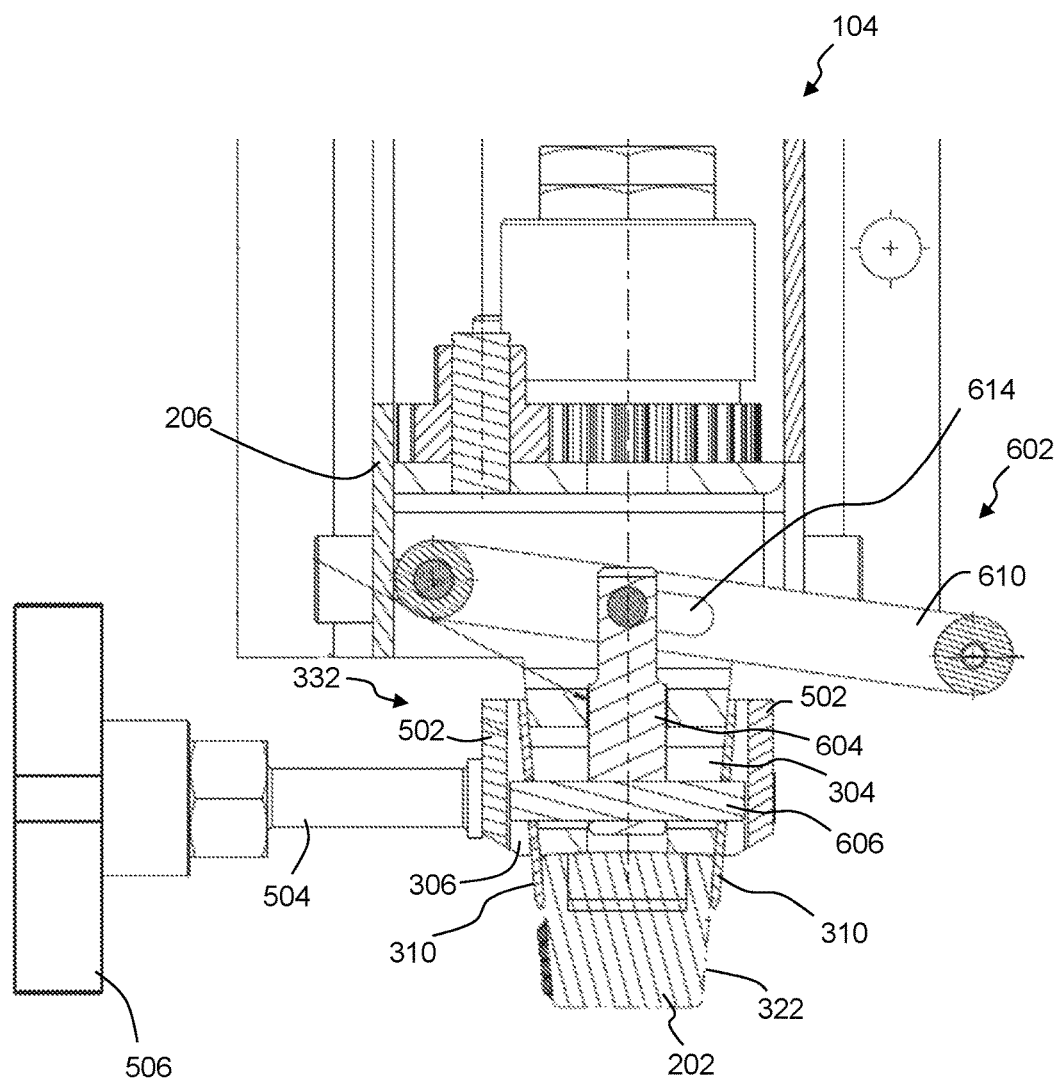
FIG. 6 illustrates a simplified cross-sectional view of a magnet gripper system, in accordance with some embodiments.

In some embodiments, the magnet gripper system 104 further includes a slide plate control system 602 that allows a user to control the position of the slide plates 310, including positioning the slide plates in retracted and extended positions, and transitioning the slide plates between the retracted and extended positions. FIG. 6 illustrates a simplified cross-sectional view of a magnet gripper system 104, in accordance with some embodiments, including an exemplary slide plate control system 602. The slide plate control system, in some instances, includes a piston 604, plunger, rod or other such structure cooperated with one or more cross supports 606 that are secured with one or more of the slide plates 310. The piston further cooperates with a slide plate control lever arm 610. The level arm is pivotably secured with the frame or other structure at a first or fixed end, and extends out away from the frame such that a second or control end is exposed and accessible to a user. In some instances, the piston cooperates with a lever arm with a bolt, pin the like extending through a slide aperture 614 that causes the piston to be moved up in response to the control end being transitioned up by a user, and causes the piston to move down in response to the control end being transitioned down.

Further illustrated in FIGS. 5 and 6 is a portion of an exemplary implementation of a slide plate clamp systems 332, in accordance with some embodiments. The slide plate clamp systems includes two or more clamp plates 502 with a threaded bolt 504 cooperated with each. Upon rotation of the bolt 504, for example with the use of clamp handles or knobs 506, the clamp plates 502 are forced toward each other and against the slide plates forcing the slide plates against sides of the of the magnet.

The slide plates can be formed from substantially any relevant material that provides the desired stability, based in part on expected magnetic forces that are predicted to be applied on the magnet as the magnet is accurately positioned onto and/or removed from the surface of the rotor core 102. Again, in assembling the rotor assembly an array of a plurality of magnets are placed on and around the exterior of the rotor core. Often these magnets are placed in sequential rows with the magnets of each row being placed within millimeters from other magnets, with multiple rows similarly closely placed to adjacent rows. Significant magnetic force(s) are produced as the number of magnets increases and their proximity to each other decreases. Accordingly, the slide plates are typically configured to rigidly secure and grip the magnet in combination with the magnetic force of the magnet with the face 312 of the gripper base 304 to maintain a precise location of the magnet relative to the gripper system while withstanding the external magnetic forces on the magnet to allow the gripper system to accurately place the magnet onto a desired position of the rotor core. In some applications, the slide plates are formed from a high yield strength material (e.g., a heat treated steel) with a desired thickness to withstand the predicted magnetic force(s), minimize deflection, and provide high force grip. In some instances, the plates may include tapered leading edge to assist guiding into narrow space.

Additionally, the thickness of the slide plates can be selected to allow the slide plates to fit between the magnet 202 being placed on the rotor core and one or more adjacent magnets that have already been placed on the rotor core. For example, for some implementations, the slide plates are formed from a relatively thin (e.g., 1/16 inch), high yield strength material (e.g., a heat treated 17-4 PH stainless steel). As such, the thin slide plates 310, when slide down around and against an exterior of the magnet, maintain the position of the magnet and resist magnetic forces while still being sufficiently thin to fit within the narrow spacing intended between the magnets on the rotor core. The ends of the slide plates that move away from the base when being extended can, in some instances, further be tapered to aid in allowing the slide plates to fit between adjacent magnets.

Further, in some embodiments, the slide plates are oriented to correspond with the exterior shape of the magnet and the magnet can be configured with a tapered shape such that a width of the magnet at the top or exposed surface of the magnet is wider than the bottom surface or surface that is to contact the rotor core. The slide plates can similarly be arranged so that they extend at an angle consistent with an exterior of the magnet. The angled further enhances the ability of the slide plates to maintain a position of the magnet as it is brought into close proximity with the surface of the rotor core and/or adjacent magnets. The reduced width between the slide plates further inhibits movement of the magnet away from the gripper base while the slide plates are clamped into position about the magnet.

The cooperation of the magnet 202 with the gripper base 304 can introduce some problems as a result of the magnetic attraction of the magnet to the face 312 of the gripper base. As such, in some embodiments, the magnet gripper system further includes one or more push rods that can be activated to prevent the magnet from inadvertently jumping and magnetically coupling with the face 312 of the gripper base.

Figure 7:
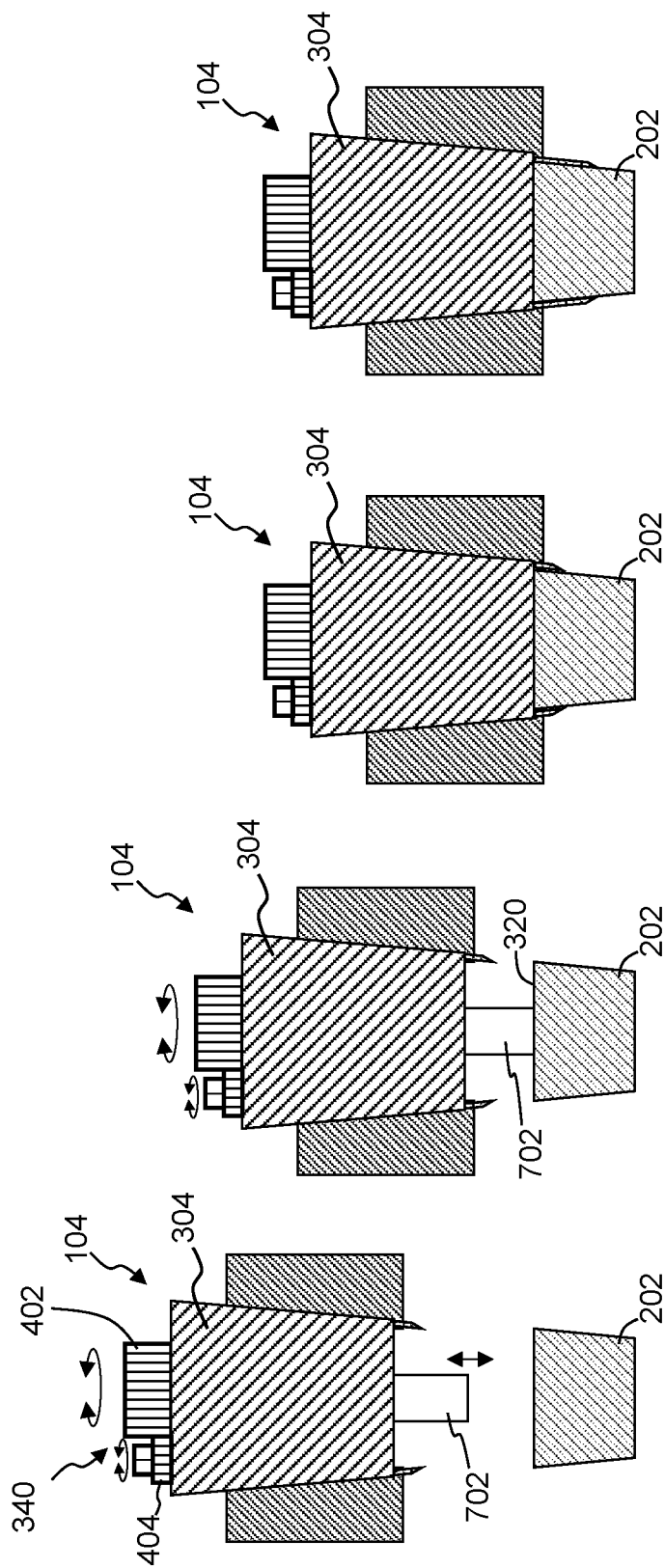
FIGS. 7A-7D illustrate, as a series, a simplified side view of an exemplary magnet gripper system cooperating with a magnet, in accordance with some embodiments.

FIGS. 7A-7D illustrate, as a series, a simplified side view of an exemplary magnet gripper system 104 cooperating with a magnet 202, in accordance with some embodiments. As illustrated in FIG. 7A, the magnet gripper system 104 is positioned relative to the magnet 202, and typically above and aligned with the magnet. In some implementations, one or more push rods 702 can be extended relative to and/or from the gripper base 304 and beyond the face 312 of the gripper base.

The one or more push rods 702 are made from a non-magnetically attractive material and/or at least include a non-magnetically attractive end. For example, the push rods can include a non-magnetic end cap (e.g., plastic, polymer, resin, aluminum, etc.) to reduce magnetic attraction, and in some instances to prevent damage to the magnet surface. The push rods 702 are positioned relative to the gripper base 304 and are configured to move between a retracted position (as illustrated, in one exemplary implementation, in FIGS. 7C-7D) and an extended position (as illustrated, in one exemplary implementation, FIGS. 7A-7D). In the extended position the one or more push rods establish a standoff spacing between the magnet and the gripper base, and inhibit the magnet 202 from magnetically attaching with the face 312 of the gripper base 304. In the retracted position the one or more push rods 702 do not interfere with the magnet 202 at least magnetically coupling with the face 312 of the gripper base, and typically do not interfere with the magnet contacting the face 312.

In cooperating with a magnet, the magnet gripper system can be lowered toward the magnet 202 and/or the magnet can be raised toward the gripper base. The one or more push rods 702 can be extended to initially contact the surface 320 of the magnet inhibiting magnetic coupling of the magnet with the face 312. The one or more push rods can then be retracted as the magnet gripper system and/or the magnet are moved toward each other (e.g., magnet gripper continues to descend at the rate the push rod is retracted.

In some embodiments, the magnet gripper system 104 further includes one or more push rod control systems 340 that allows a user to control the extension and retraction of one or more push rods. In some instances, the push rods can be bolts or other such structure that threadedly cooperate relative to the gripper base and can be rotated to move the push rod between the extended and retracted positions. Other implementations the push rod control system includes gearing to cooperatively control the movement of two or more push rod. As illustrated in FIGS. 3-4 and 7A-D, in some implementations each push rod can be cooperated with a gear 402 that in turn is cooperated with a primary gear 404 that can be rotated with a handle, wrench, ratchet wrench, lever, servo-motor, other such methods or combination of two or more of such methods.

Figure 8:
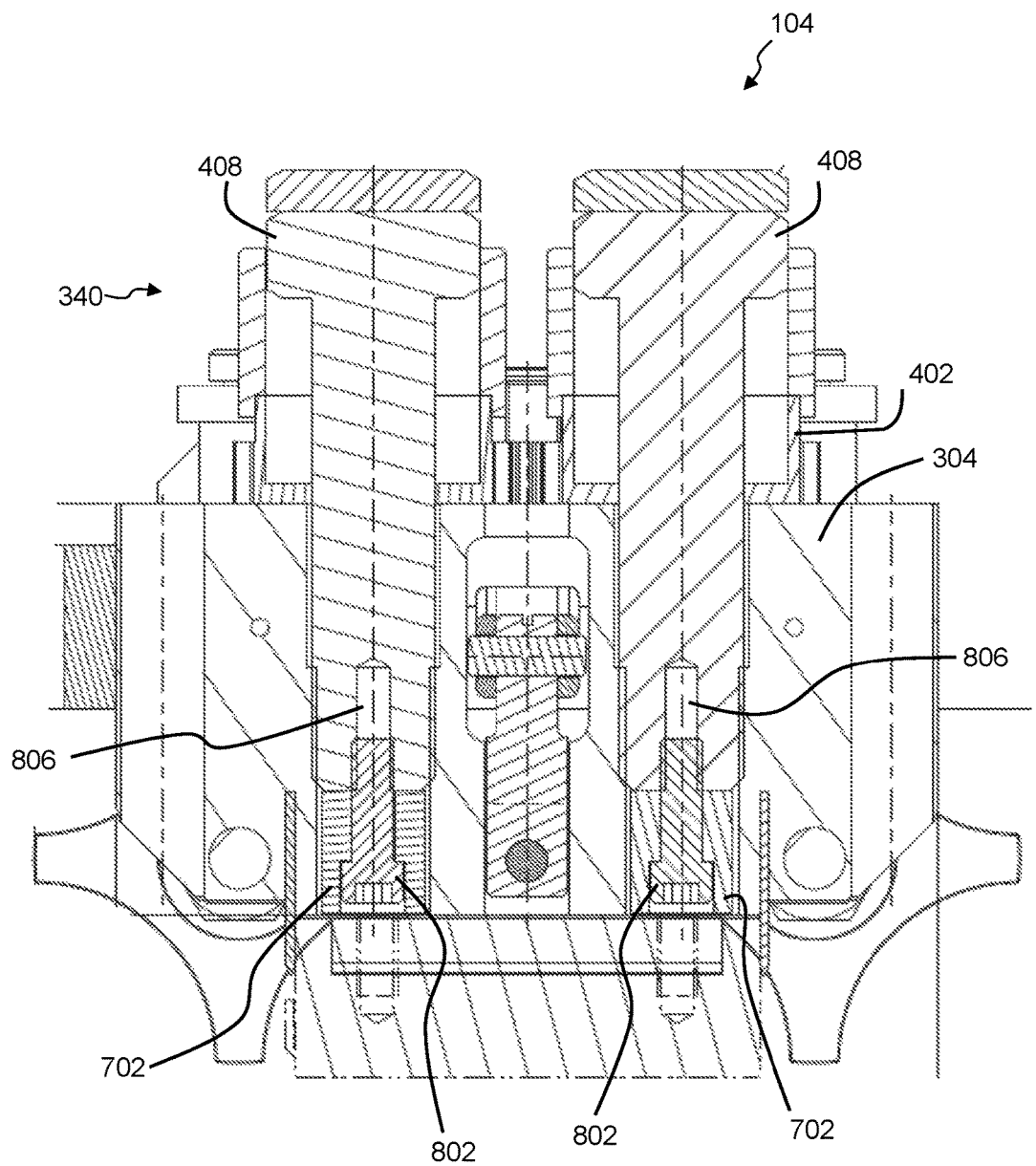
FIG. 8 shows a cross-sectional view of a magnet gripper system, in accordance with some embodiments, further illustrating push rods cooperated with a push rod control system.

FIG. 8 shows a cross-sectional view of a magnet gripper system 104, in accordance with some embodiments, further illustrating the push rods 702 cooperated with the push rod control system 340. The push rods 702 are secured with end bolts 802 that threadedly cooperate with push bolts 408 and are configured to move along an interior threaded channel 806 of the push bolts. As the gears 402 engage the push bolts to rotate the push bolts as the gears are rotated. The rotation of the push bolts in turn cause the end bolts to retract and extend such that the push rods 702 are retracted or extended relative to the gripper base 304.

Again, some embodiments include the push rod control system 340 that can cooperatively control multiple push rods. In some implementations the push rod control system couples with and/or controls multiple push rods and can include gearing that cooperates with the multiple push rods and mechanically synchronizes the extension and retraction of the multiple push rods. In some applications, the push rod control system includes the primary gear 404 that engage the corresponding gears 402 that cooperate with respective push bolts 408. The rotation of the primary gear (e.g., through the rotation of a handle, crank, lever, wrench, etc.) rotates the gears 402 to extend or retract the push rods 702.

The one or more push rods 702 can further be utilized in disengaging the magnet from the magnet gripper system 104. Again, in some implementations, the face 312 of the gripper base 304 is magnetically attractive and as such the magnet 202 magnetically couples with the gripper base. Accordingly, once the one or more slide plates are unclamped the push rod control system can be activated to extend the push rods that can push on the magnet to overcome at least the magnetic force between the magnet and the gripper base.

Figure 9:
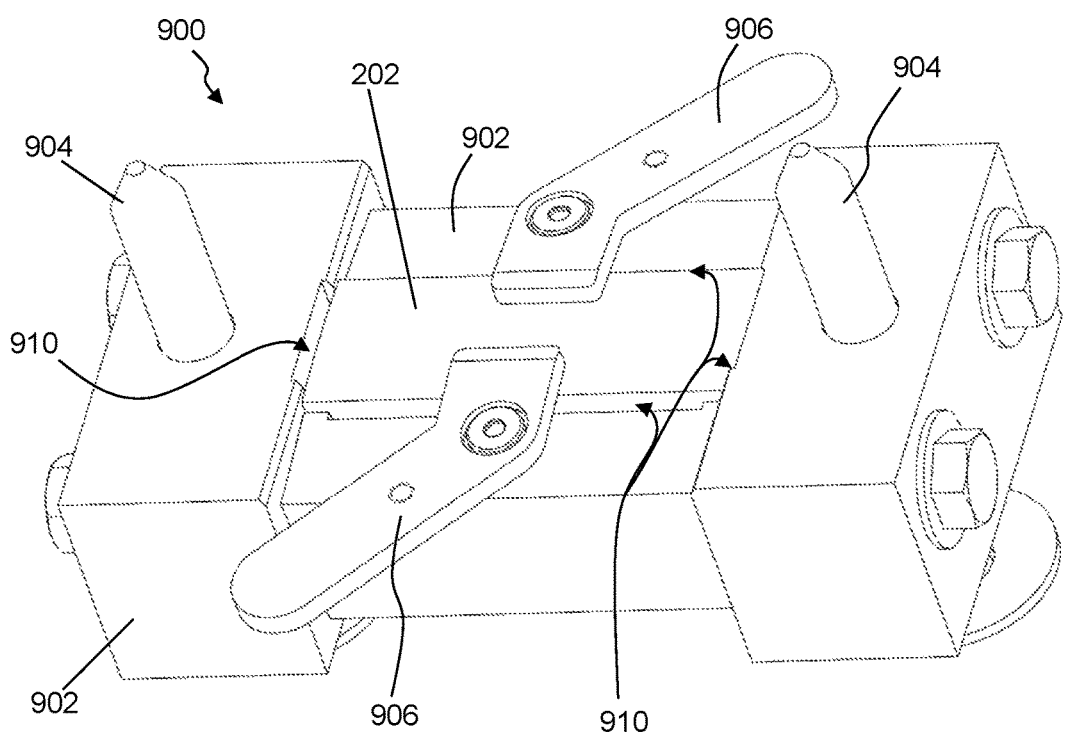
FIG. 9 illustrates a simplified perspective view of an exemplary magnet cradle, in accordance with some embodiments.
Figure 10:
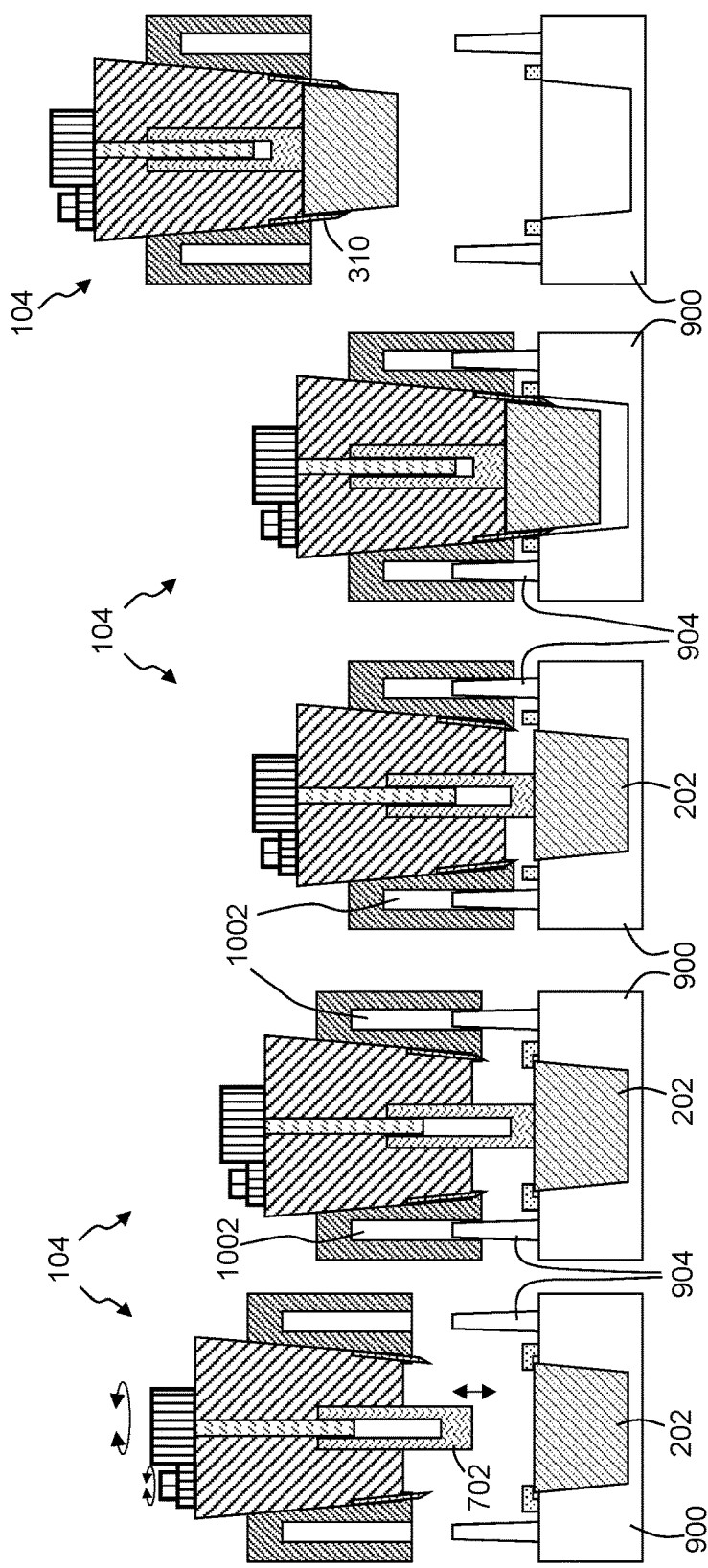
FIGS. 10A-10E illustrate, as a series, a simplified side view of an exemplary magnet gripper system cooperating with a magnet cradle to grip a magnet, in accordance with some embodiments.

FIG. 9 illustrates a simplified perspective view of an exemplary magnet cradle 900, in accordance with some embodiments. In cooperating a magnet 202 with the magnet gripper system 104, some embodiments further utilize a magnet cradle or bracket to at least in part maintain a position of the magnet while being cooperated with the magnet gripper system. The cradle includes a cradle frame 902 that defines and/or includes one or more cavities, channels, apertures, or the like to receive one or more magnets 202. Typically, the cradle frame is assembled and/or formed from non-magnetic material and shaped to receive one or more magnets. In some instances, the cradle, frame is molded from plastic, one or more parts may be molded and secured together to form the cradle frame, one or more parts can be made from wood, aluminum, or other non-magnetic material. In other instances, the magnet cavity can be walled with non-magnetic material while other parts of the cradle frame are made from magnetically attracted material. Further, in some embodiments, the magnet cradle can be secured with a base or other structure to maintain a position of the cradle when in use. For example, the magnet cradle may be movably secured with the rotor assembly system 100 and moved into position to allow the magnet gripper tool to retrieve the magnet. Additionally or alternatively, in some implementations the cradle can be secured with a floating base mount that allows movement of the cradle to accommodate alignment movement to align the cradle with the magnet gripper system.

Some implementations include one or more magnet securing structures 906 that secure the magnet with the cradle while the magnet gripper system is moved into position to grip the magnet. The magnet securing structure can be provided through one or more bars, pins, latches, levers, other such structures or combination of such structures. For example, one or more magnet latches 906 can be cooperated with the cradle frame 902. The magnet latches are configured to transition from a latched state and an unlatched state. In the latched state the magnet latches are configured to keep the magnet 202 within the cradle frame as the magnet gripper system cooperates and grips the magnet. In some instances the magnet latches in the latched state maintain at least a vertical position of a magnet within the cradle as a magnet gripper system 104 is lowered onto the magnet 202. In the unlatched state the magnet latches are removed from the magnet such that the magnet is free to move from the magnet cradle (e.g., move vertically relative to the magnet cradle as magnet gripper system withdraws from the magnet cradle. In some applications, the magnet latches are pivotably secured with the cradle frame to allow the latches to be pivoted between the unlatched state to allow the magnet to be positioned within the cradle and removed from the cradle, and the latched state. Further, the latches may include an extended shelf that extend over at least a portion of the magnet (or into a groove of the magnet, or other such method of engaging the magnet) when in the latched state. Further, in some embodiments, the latches include handles, lever arms or the like that extend out away from the cradle frame. The length of the handles can be configured to allow a user to easily reach the handles and unlatch the magnet latches while the magnet gripper system is lowered onto the magnet.

In some embodiments, the cradle frame further includes one or more guide pins 904 that extend from the cradle frame 902. The guide pins protrude from the cradle frame and are configured to mate with corresponding one or more one or more guide pin channels of the magnet gripper system 104.

FIGS. 10A-10E illustrate, as a series, a simplified side view of an exemplary magnet gripper system 104 cooperating with a magnet cradle 900 to grip a magnet 202, in accordance with some embodiments. The magnet gripper system 104, in some implementations, is lowered toward the magnet 202 and magnet cradle 900. Again, some embodiments further include the push rod 702 that can be extended as the magnet gripper system is brought into contact with the magnet 202. In some applications, the push rod continues to be in contact with the magnet as the push rod is retracted such that the magnet gripper system moves closer to the magnet (e.g., see FIGS. 10B-10D).

Further, in some implementations the guide pins 904 of the magnet cradle are configured to align with the guide pin channels 1002 (see FIGS. 10B-10D) as the magnet gripper system is moved into position to grip the magnet. The guide pin channels mate with corresponding one or more guide pins of a magnet cradle establishing accurate alignment of the magnet 202 with the gripper base and the two or more slide plates 310.

Referring back to FIG. 9, in some embodiments, the cradle frame 902 and one or more magnet cavities can further be configured with slide plate grooves 910 configured to allow the slide plates to be lowered and clamped into the extended position while the magnet is maintained within the cradle. Further, as introduced above, in some implementations the ends of the slide plates are tapered to aid in allowing the slide plates to more easily enter the slide plate grooves between the magnet and the sides of the magnet cradle, and fit between adjacent magnets when placing magnets or removing magnets on the rotor core. Once the magnet is secured within the magnet gripper system, the magnet latches can be disengaged and the magnet gripper tool retracted away from the magnet cradle removing the magnet from the magnet cradle while rigidly maintaining a position of the magnet relative to the magnet gripper tool.

As described above with reference to FIGS. 1 and 2, in some embodiments, the magnet gripper system 104 is mounted on and/or cooperated with one or more slide systems. For example, in some embodiments, the magnet gripper system is mounted on a vertical positioning slide system 106 that is utilized by a user to control the vertical movement of the magnet gripper system. Some implementations include one or more vertical screw drives that when activated lift the magnet gripper system. The vertical positioning slide system is further configured, in at least some applications, to allow the magnet gripper system to move vertically down but without applying any force on the magnet gripper system and/or frame of the magnet gripper system. Instead, the weight of the magnet gripper system, and when relevant any magnet gripped by the gripper system, causes the magnet gripper system to move down when allowed by the vertical positioning slide system.

Figure 11:
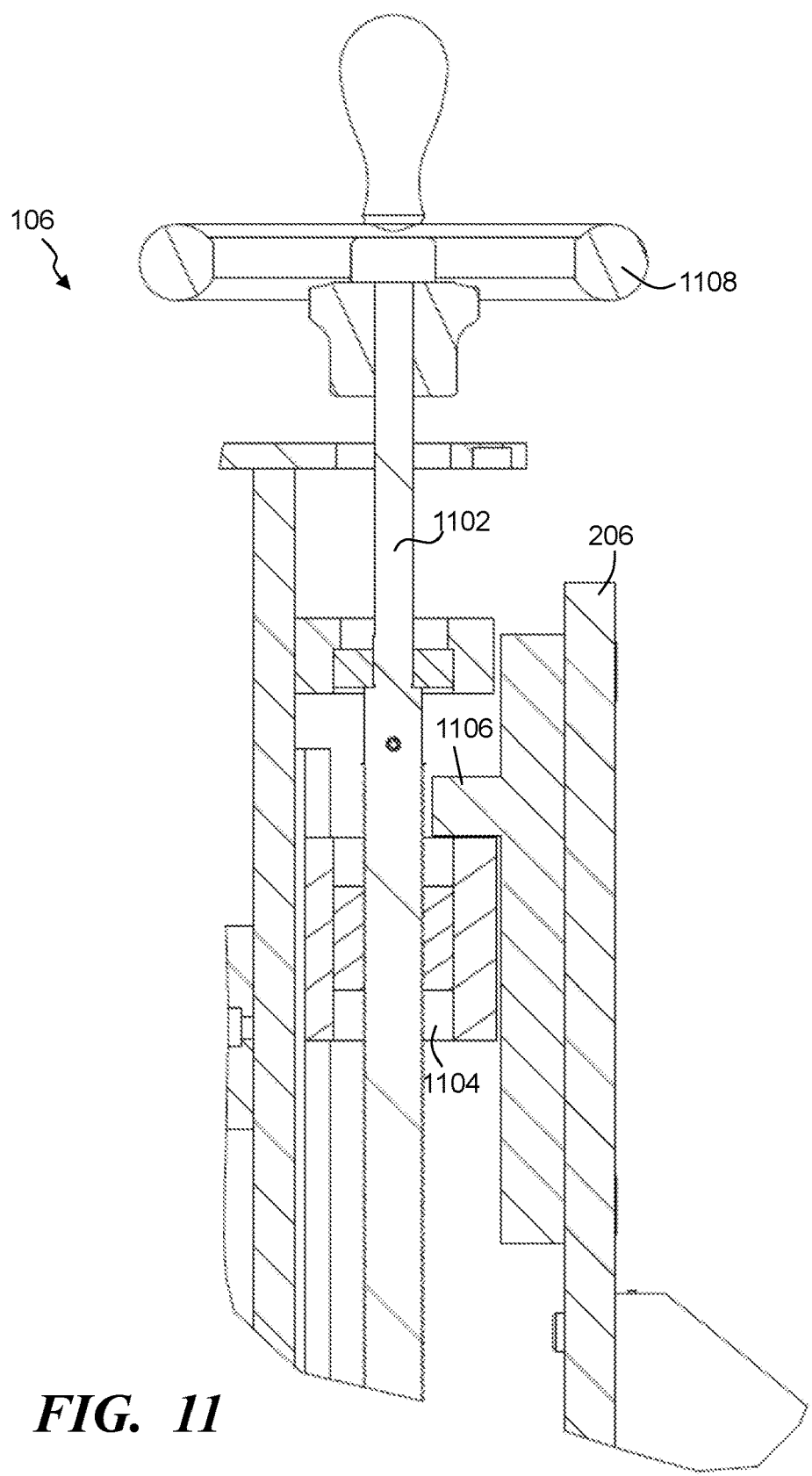
FIG. 11 illustrates a simplified cross-sectional view of a portion of a vertical positioning slide system, in accordance with some embodiments.

FIG. 11 illustrates a simplified cross-sectional view of a portion of a vertical positioning slide system 106, in accordance with some embodiments. The vertical positioning slide system includes one or more guides 1102 or threaded lift rods, one or more movable stop supports or threaded blocks 1104 cooperated with each guide, and one or more support arms 1106 extending from and/or cooperated with the frame 206. In some implementations, the movable stop supports 1104 are threadedly cooperated with a respective one of the guides 1102. Additionally in some applications, the support arm 1106 may cooperate with the one or more guides (e.g., having an aperture through which a guide extends and along which the support arm moves). A vertical control system 1108 is coupled with the one or more guides 1102 to control a vertical position of the one or more stop supports cooperated with the one or more guides and thus control the vertical position of the magnet gripper system.

In some implementations the guide 1102 is threaded cooperated with the stop support 1104. As the guide 1102 is rotated (e.g., by user using a hand crank of the vertical control system 1108, a user or control system controlling a servomotor, or other such method), the stop support 1104 moves up or down depending on a direction of rotation of the guide.

Again, the one or more support arms 1106 are fixed to the frame that in turn is secured with the magnet gripper system (e.g., secured with the gripper base). The one or more support arms can further be cooperated with the one or more guides such that the gripper system is free to move vertically along the one or more guides between the one or more stop supports and an upper bound. When one or more support arms 1106 are in contact with the one or more stop supports 1104 the one or more stop supports support the weight of at least the frame, gripper base, the at least two slide plate retaining systems and corresponding slide plates.

The support arm 1106, when in contact with the stop support 1104, is supported by the stop support, but otherwise is not fixed to the stop support and can separate from the stop support. Accordingly, when the stop support is moved in an upward direction it will lift support arm and thus the attached frame 206 and magnet gripper system once the stop support contacts the support arm 1106. As the stop support 1104 moves down, however, the magnet gripper system moves down with the stop support due to the weight of the magnet gripper system as long as nothing interferes with the downward movement of the magnet gripper system. The stop support can continue to move down and separate from the support arm 1106 when the magnet gripper system is stopped from moving down. Similarly, when an upward force is applied to the gripper system it freely moves upward independent of the stop support 1104. Again, however, the upward movement of the stop support raises the magnet gripper system when it contacts and lifts the support arm 1106.

The free downward movement of the magnet gripper system allows the magnet gripper tool to in part utilize the push rods 702 and push rod control system. When the push rods are extended the vertical positioning slide system does not force the magnet gripper system down and avoids inducing undue force on the magnet (and cradle when utilized). Similarly, by lowering the stop support 1104 below the surface 320 of the magnet, control of the lowering of the magnet gripper tool is provided through the retraction of the push rods allowing the magnet gripper system 104 to lower onto the magnet as a function of the weight of the magnet gripper system and magnet. Similarly, when applying the magnet to a rotor core, the lowering of the stop support 1104 does not inadvertently induce an undue downward force by the magnet on the exterior of the rotor core. Further, when disengaging the magnet, with the slide plates unclamped, the push rods can be extended which causes the magnet gripper system to be pushed away from the magnet. This effectively lifts the magnet gripper system and overcomes the magnetic force between the magnet and the gripper base, and decouples the magnet from the gripper base without having to synchronize the operation of the push rods with the lifting by the stop support 1104 and vertical positioning slide system 106. Once separated the vertical control system can be activated to lift the magnet gripper system further away from the magnet.

Figure 12:
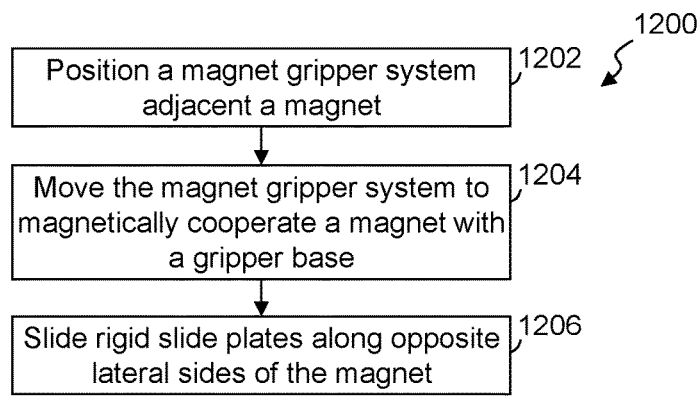
FIG. 12 shows a simplified flow diagram of a process of assembling a rotor system, in accordance with some embodiments.

FIG. 12 shows a simplified flow diagram of a process 1200 of assembling a rotor system, in accordance with some embodiments. In step 1202, a magnet gripper system is positioned adjacent a magnet 202. In some implementations, the one or more slide systems are utilized to position the magnet gripper system over a magnet. Further, the magnet may be cooperated with a magnet cradle 900 that in part helps to establishing accurate alignment of the magnet with the gripper base 304 and/or the two or more slide plates 310. The use of the magnet cradle can allow for the alignment of one or more guide pin channels 1002, which are cooperated with the gripper base 304 and/or formed in the gripper base, with one or more corresponding guide pins 904 of the magnet cradle. In moving the magnet gripper system 104 and/or the magnet 202, the one or more guide pin channels 1002 can be mated with the corresponding one or more guide pins 904 of a magnet cradle establishing accurate alignment of the magnet 202 with the gripper base 304 and the at least two rigid slide plates 310.

In step 1204, the magnet gripper system is moved such that the magnet is magnetically cooperated with a gripper base of the magnet gripper system. In some embodiments, one or more push rods 702 are utilized in cooperating the magnet with the gripper system. One or more push rods can be positioned, while in an extended position, in contact with an exterior surface 320 of the magnet. The one or more push rods can be configured with non-magnetically attractive ends such that the non-magnetically attractive ends are in contact with the exterior surface 320 of the magnet and prevent the magnet from magnetically coupling with the gripper base. At least some of the positioning and the magnetically cooperating of the magnet with the gripper base 304 can, in some implementations, include retracting the one or more push rods and allowing the magnet to magnetically couple with the gripper base. Further in some embodiments, the movement of the magnet gripper system uses only gravitational force to lower the gripper base while the one or more push rods are retracted allowing the gripper base to come into contact with the surface of the magnet and the magnet to magnetically couple with the gripper base.

In step 1206, the two or more rigid slide plates 310, which are slidably secured with the gripper base 304 of the magnet gripper system, are slid along opposite lateral sides 322 of the magnet 202 such that the slide plates in cooperation with the magnetic attraction between the magnet and the gripper base maintains a position of the magnet relative to the gripper base. In some embodiments, two or more of the slide plates 310 are angled consistent with the shape of the magnet 202. As such, at least two rigid plates 310 are slide at an angle toward each other when slid toward an extended position such that ends of the slide plates distal from the gripper base 304 are closer together when in the extended position than when the slide plates are in a retracted position. Further, some embodiments laterally clamp the slide plates 310 relative to the gripper base 304 and against the lateral sides 322 of the magnet 202 while the slide plates are in the extended position.

Once one or more magnets 202 are cooperated with the magnet gripper system 104, the magnet gripper system can be positioned proximate an exterior surface of a rotor core 102. In some implementations the magnet gripper system is positioned using one or more slide systems (e.g., vertical positioning slide system 106, longitudinal slide system 108, cross slide system 110). The slide system allows the magnet gripper system to be raised with the magnet and moved into position relative to the rotor core. Further, the magnet gripper system and/or magnet is aligned with an intended position of the magnet on the rotor core. The magnet gripper system can then be moved such that the magnet is magnetically cooperated with the exterior surface of the rotor core while the cooperation of the rigid side plates and the magnetic attraction between the magnet and the gripper base maintains a precise position of the magnet relative to the rotor core and the intended position of the magnet. In some applications, this can include lowering the gripper system until the magnet contacts the rotor core at the desired position. One or more spacers can be secured on each magnet and/or fitted between magnets after placement in attempts to maintain positioning and spacing between magnets. Spacers secured with the magnets are positioned so that they do not interfere with the slide plates.

Once the magnet is positioned onto the rotor core (and/or otherwise intending to disengage the magnet from the magnet gripper system), the clamping system can be deactivated to release the clamping force on the two or more slide plates. The rigid slide plates can then be slid along the lateral sides of the magnet to respective retracted positions. The magnetic coupling typically continues to exist between the gripper base 304 and the magnet 202. As such, in some instances one or more push rods 702 are extended such that the non-magnetically attractive ends contact the magnet and push the magnet away from the gripper base overcoming the magnetic attraction between the magnet and the gripper base and disengaging the magnet gripper system from the magnet. In some embodiments, one or more securing structures (e.g., restraining clamps, magnet bridges, etc.) can temporarily or permanently be cooperated with the magnet to retain a relative positioning of the magnet on the rotor core.

The process 1200 can be repeated any number of times to allow numerous magnets to be placed on the rotor core. As described above, the placement of the magnets on the rotor core is complicated by the magnetic forces applied on a magnet being placed on the rotor core by the other magnets that have already been placed on the rotor core. Further, the magnets are often placed in close proximity to each further making the placement of magnets difficult. Still further, many rotor assemblies are relatively large in size, with relatively large magnets and/or correspondingly large magnetic forces. For example, it is not uncommon for the magnets to provide a 100 lbs. or more of magnetic force. As such, the placement of magnets can be difficult.

Furthermore, correspondingly similar magnetic forces are applied to magnets already placed on the rotor core as one or more subsequent magnets are placed on the rotor core during assembly. This can cause undesired movement of already positioned magnets and can disrupt the desired magnet configuration on the rotor core. Some embodiments utilize one or more methods of maintaining positioning of magnets previously positioned on the rotor core as subsequent magnets are placed on the rotor core.

Figure 13:
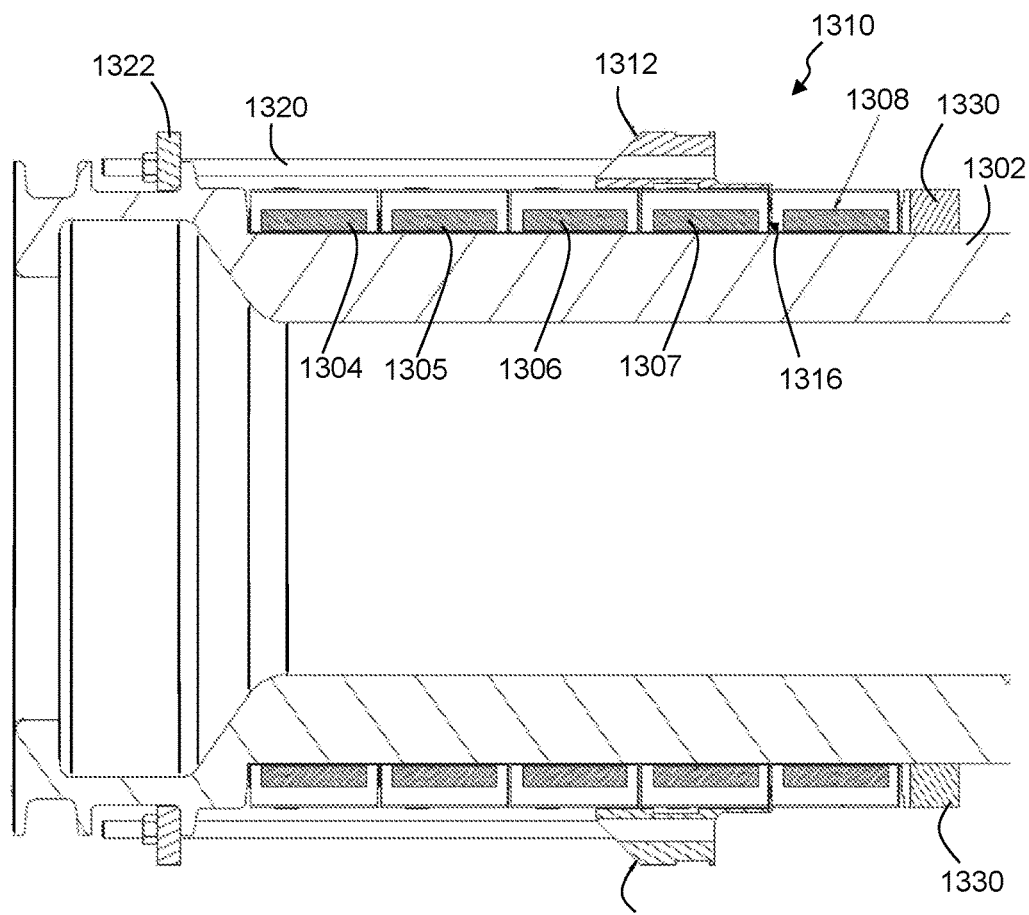
FIG. 13 illustrates a simplified cross-sectional view of an exemplary rotor core with a row of magnets in the process of being cooperated with the rotor core, in accordance with some embodiments.

FIG. 13 illustrates a simplified cross-sectional view of an exemplary rotor core 1302 with a plurality of rows of magnets 202 (in this example, four rows 1304-1307) positioned about a portion of an exterior of the rotor core, and a fifth row 1308 of magnets 202 in the process of being cooperated with the rotor core, in accordance with some embodiments. Each row comprises a series of multiple magnets spaced round the circumference of the rotor core. Further cooperated about the rotor core is an exemplary axial restraint apparatus or system 1310 that includes an axial restraint ring 1312, in accordance with some embodiments. In some implementations, the axial restraint ring 1312 is positioned about the circumference of the row of magnets (in this example, row 1307) directly adjacent the row of magnets being positioned on the rotor core (in this example, row 1308).

Figure 14:
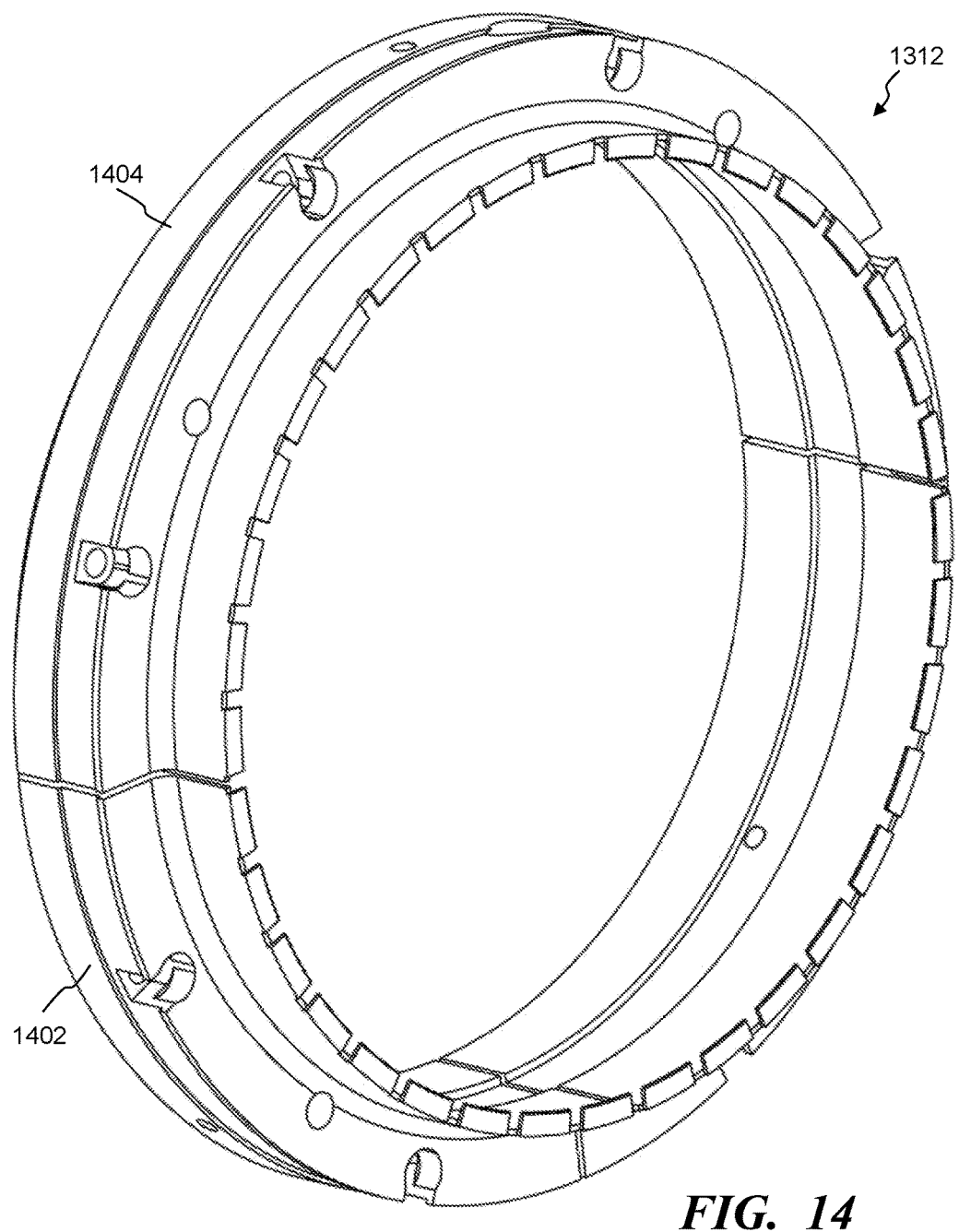
FIG. 14 shows a simplified isometric view of an exemplary axial restraint ring, in accordance with some embodiments.
Figure 15A:
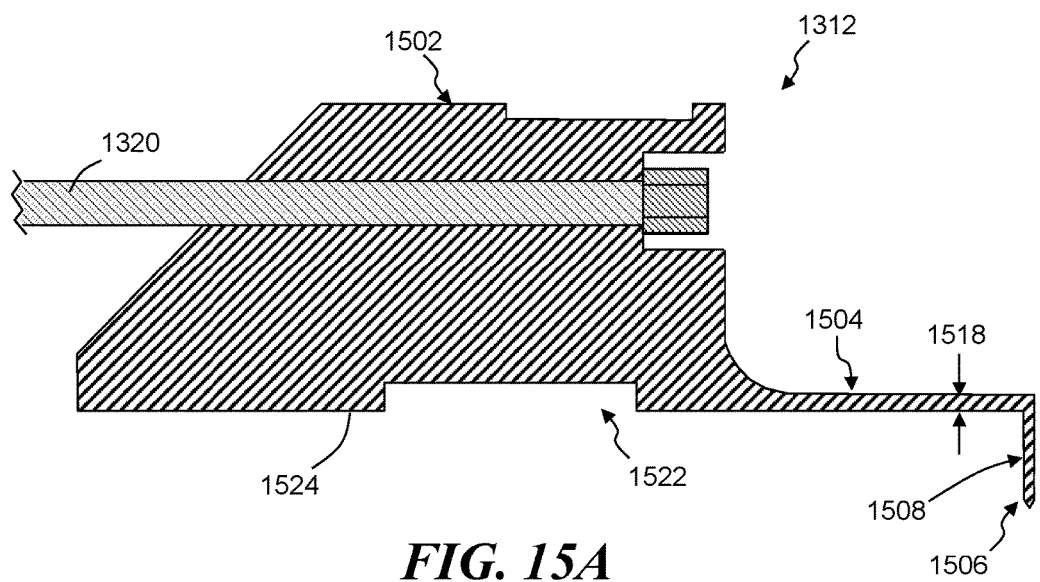
FIG. 15A illustrates a simplified cross-sectional view of an exemplary axial restraint ring, in accordance with some embodiments.
Figure 15B:
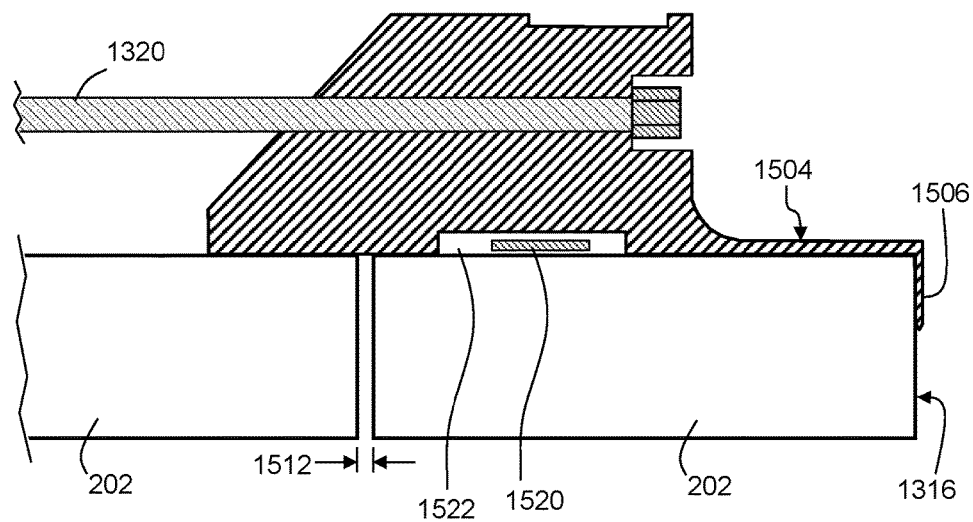
FIG. 15B illustrates a simplified cross-sectional view of an exemplary axial restraint ring mounted on a series of magnets, in accordance with some embodiments.
Figure 16:
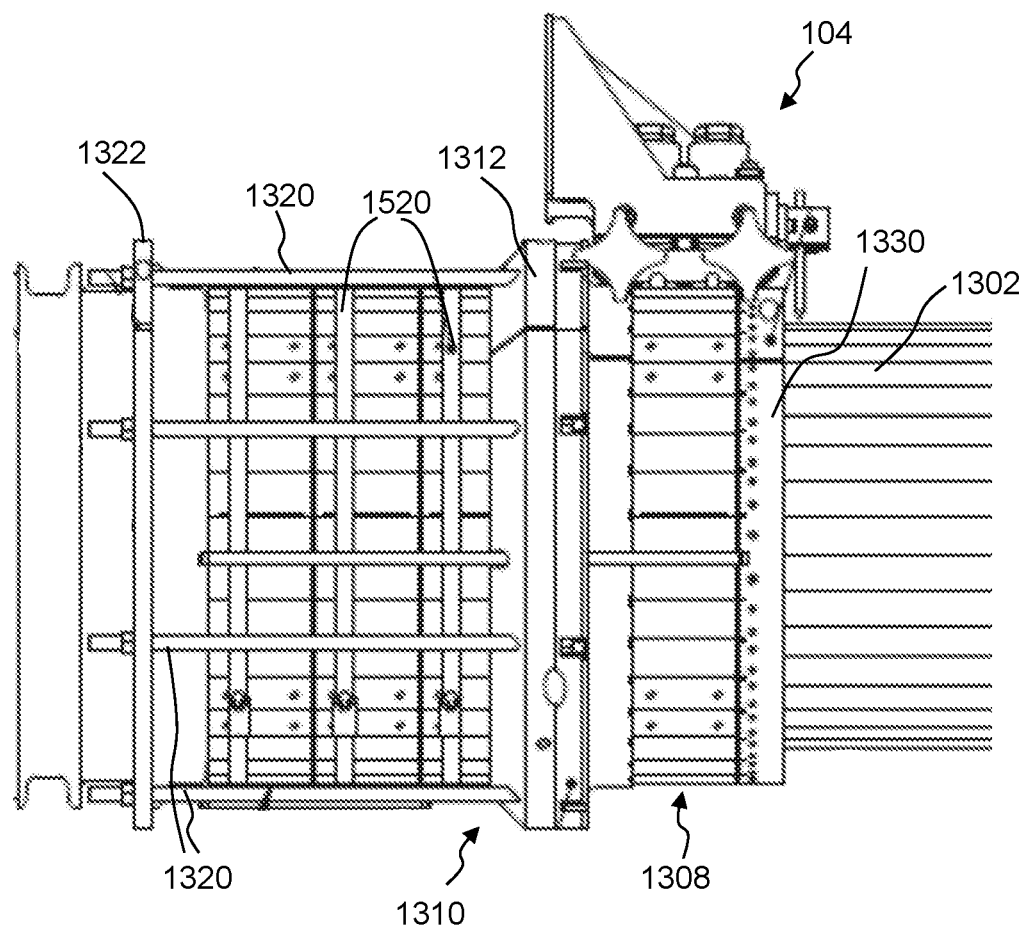
FIG. 16 illustrates a plane view of a rotor core cooperated with an axial restraint system, in accordance with some embodiments.

FIG. 14 shows a simplified isometric view of an exemplary axial restraint ring 1312, in accordance with some embodiments. FIG. 15A illustrates a simplified cross-sectional view of an exemplary axial restraint ring 1312, in accordance with some embodiments. FIG. 15B illustrates a simplified cross-sectional view of an exemplary axial restraint ring 1312 mounted on a series of magnets 202, in accordance with some embodiments. FIG. 16 illustrates a plane view of a rotor core 1302 cooperated with an axial restraint system 1310, in accordance with some embodiments. Further illustrated in the example of FIG. 16 are multiple rows of magnets previously positioned and secured about the rotor core 1302 and a subsequent row 1308 of magnets being positioned onto the rotor core. An exemplary axial restraint ring 1312 is positioned on and about a row of magnets (under the axial restraint ring and not visible in FIG. 16) previously positioned on the rotor core and adjacent the row of magnets 1308 being positioned on the rotor core, in accordance with some embodiments.

Referring to FIGS. 13-16, the axial restraint ring system 1310 provides an apparatus that at least in part maintains magnet positioning during rotor assembly. The axial restraint ring system 1310 includes the axial restraint ring 1312 that in some implementations includes two or more ring restraint segments 1402, 1404 that are secured together forming a hollow ring. The axial restraint ring can include substantially any number of ring restraint segments. Further, the ring restraint segments can be substantially identical in length and/or radius, however, in other instances different length sections can be utilized to form the ring that mirrors the outer shape of the ring of magnets 1307 previously positioned and adjacent the row of magnets being positioned about the rotor core. The ring restraint segments are secured together such that the axial restraint ring is formed around the rotor core 1302 and the one or more series or rows of magnets (e.g., 1307 and potentially 1306). In some implementations, the axial restraint ring is configured with an interior diameter, defined between opposite support surfaces 1524, that corresponds with a diameter defined between exterior surfaces 320 of magnets on opposite sides of the rotor core. Further in some instances, the interior diameter of the axial restraint ring can be such that it induces a radial compression force on the series of magnets upon which it is placed in attempts to further inhibit movement of the magnets. This radial compression force is such that it does not damage the magnets or the rotor core.

In some embodiments, each ring restraint segment 1402, 1404 comprises a body 1502, one or more shoulders 1504 extending from the body, and one or more flanges 1506 extending at an angle from an end of each of the one or more shoulders. Each of the one or more flanges 1506 includes an interior surface 1508 that faces toward an interior of the hollow ring when the two or more ring restraint segments 1402, 1404 are cooperated. In some implementations, as illustrated in FIG. 14, multiple flanges and/or a flange includes multiple segments or fingers that extend radially inward. The axial restraint ring 1312 is configured to be positioned about a series of magnets that typically form a row of magnets that are positioned on an exterior surface of a rotor core 1302. The two or more ring restraint segments 1402, 1404 can be securing together about the series of magnets forming the axial restraint ring about the series of magnets. When the axial restraint ring is in use and positioned on a previously positioned series of magnets, the interior surface 1508 of each of the one or more flanges 1506 is configured to contact an end 1316 or lateral side of one or more of the magnets of the previously positioned series or row of magnets.

Further, in some implementations, the axial restraint system 1310 further includes a set of two or more axial drivers 1320. Each of the axial drivers cooperates with the body 1502 of one of the ring restraint segments 1402, 1404 and extend away from the corresponding ring restraint segment to cooperate with one or more anchors 1322. In some implementations the anchor 1322 is a ring shaped anchor that is secured with a portion of the rotor core, such as to an end of the rotor core, a lip formed at one or more locations around the circumference or completely around a circumference of the rotor core, with some rigid structure separate from the rotor core (e.g., a wall, part of a rotor assembly system 100, etc.), or the like. The axial drivers 1320 are utilized to induce a force on the axial restraint ring 1312 toward the anchor 1322. The axial drivers can be rods, cables, straps, beams, or other structures that can be extended between the axial restraint ring 1312 and the anchor 1322.

As illustrated in FIGS. 15A-15B, in some embodiments the axial drivers 1320 are cooperated with the body 1502 of the axial restraint ring 1312. In some instances, the axial driver is a rod that extends through a bore of the body with a bolt head, one or more nuts, or other such structure to secure the axial driver with the body. Similarly, in some implementations, the axial driver extends to the anchor 1322 and through a corresponding bore in the anchor.

In some embodiments, the axial drivers 1320 include a series of threaded rods or rods that have at least threaded portions extending along at least a portion of a distal end of the rods. The rods can be positioned proximate the one or more anchors 1322 with at least one axial driver being cooperated with each of the two or more ring restraint segments 1402, 1404 and extend between the body and the one or more anchors. The one or more threaded nuts or the like can be moved alone a length of the axial driver to press against the anchor to induce the axial force. The plurality of axial drivers 1320 are spaced around the axial restraint ring and about the circumference of the rotor core, and further are typically equally spaced around the rotor core.

The plurality of axial drivers 1320, when activated, are typically configured to induce an axial force on the ring restraint segments 1402, 1404. The axial force is generally parallel with a central axis of the hollow ring and a longitudinal and/or rotational axis of the rotor core. The induced axial force is then transferred through the body 1502, the shoulders 1504 and to the one or more flanges 1506. Again, the axial restraint ring 1312 is positioned on and about a series of previously placed magnets, with the interior surface (or surfaces) 1508 in contact with the ends of each of the magnets of the series of magnets. Accordingly, the axial force is applied by the interior surface 1508 of the one or more flanges onto the ends or side of each of the magnets of the previously positioned series of magnets in at least temporarily maintaining an axial position of each of the magnets of the series of magnets. In some implementations, the threaded portion of each of the axial drivers can be utilized to increase the axial force applied on the series of magnets. The angle at which the flange 1506 extends from the shoulder 1504 is sufficient to enable the axial force to be applied to the magnets. In some implementations the angle is such that the interior surface 1508 of the one or more flanges are positioned at about a 90 degree angle relative to the axial force induced by the plurality of axial drivers. In other implementations, the angle at which the one or more flanges extend from the shoulder can depend on the shape of the end of the magnet.

The axial restraint ring can be constructed of substantially any relevant material capable of withstanding the intended axial forces to be applied to the magnets. In some instances, some or all of the axial restraint ring is constructed from a non-magnetically attractive metal alloy. Further, in some embodiments each of the one or more flanges 1506 is continuous with one of the one or more shoulders 1504 with the shoulders and the flanges being formed from a single rigid material.

The forces applied by the axial restraint ring at least in part aid in maintaining at least an axial position of the series of magnets upon which it is mounted while a subsequent series of magnets are placed on the rotor core 102. As introduced above, in at least some implementations the magnets are positioned on the rotor core with spacing 1512 between the magnets. The flange 1506 is configured to fit between the spaces 1512 between rows of magnets. Accordingly, the flange has a relatively thin thickness. Typically, the one or more flanges 1506 have a maximum thickness that is less than the spacing 1512 intended between a first series of magnets, configured to be arranged in a circumferential row about the rotor core perpendicular to the longitudinal axis of the rotor core, and a second series of magnets configured to be arranged in a circumferential row adjacent the ends of the magnets of the first series of magnets. Additionally, in some embodiments, the thickness of the flange is thinner than a thickness 1518 of the shoulder 1504 at least proximate the ends of the shoulders.

Figure 17:
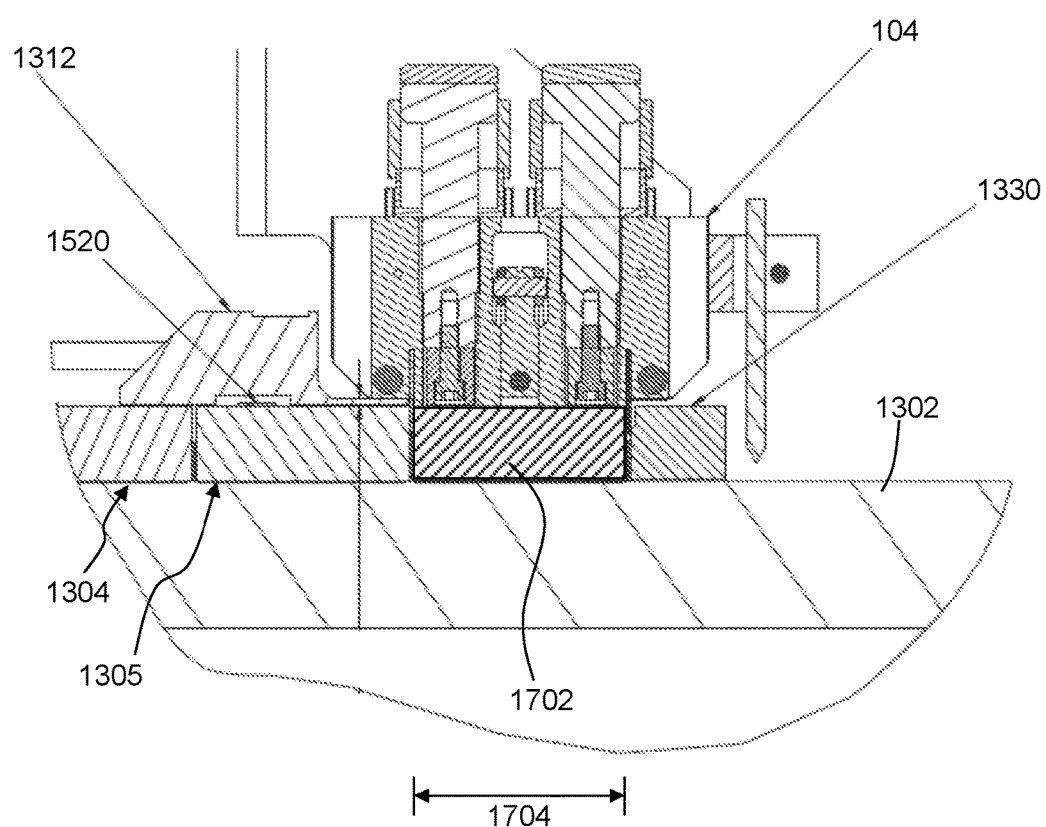
FIG. 17 illustrates a simplified cross-sectional view of a portion of a rotor core with an axial restraint ring mounted on rows of magnets, and a magnet gripper system positioned relative to the rotor core, in accordance with some embodiments.

FIG. 17 illustrates a simplified cross-sectional view of a portion of a rotor core 1302 with an axial restraint ring 1312 mounted on previously mounted series or rows 1304, 1305 of magnets, and a magnet gripper system 104 positioned relative to the rotor core 1302 while placing (or removing) a magnet 1702 of a subsequent row or series of magnets, in accordance with some embodiments. Again, the magnet gripper system is configured to securely grip a magnet so that it can be accurately placed on the rotor core 1302 while withstanding the magnetic forces applied by at least the one or more previous series of magnets 1305 on at least the magnet 1702 being placed on the rotor core. Accordingly, in some embodiments the magnet gripper system when lowered into position to place the magnet extends beyond the width 1704 of the magnet 1702, and can extend over the adjacent previously positioned magnets.

In some implementations the shoulder 1504 of the axial restraint ring 1312 is configured with a relatively low profile and/or thin thickness 1518. This low profile allows axial restraint ring to be positioned about the previously positioned series of magnets 1305 while providing a clearance for the magnet gripper system and allowing the magnet gripper system to be lowered into position without interfering with the magnet gripper system in placing subsequent magnets onto the rotor core. For example, in some applications, the one or more shoulders 1504 have a low profile at least proximate the ends of the one or more shoulders with a thickness of less than 0.1 inches.

Further, in some implementations, the thickness of the flange 1506 of the axial restraint ring 1312 may further be configured while taking into consideration the use of the magnet gripper system 104, including when the magnet gripper system includes slide plates 310 on a side that may extend between the magnet 1702 being placed on the rotor core 102 and the flange 1506. In other instances, however, gaps in the shoulder 1504 and/or flange 1506 may be included in the axial restraint ring to accommodate one or more slide plates 310 within the space 1512 intended between rows of magnets.

Referring back to at least FIG. 15B, in some implementations one or more ring or band clamps 1520 or other such clamping system may be placed around a row of magnets and tightened to help in maintaining a position of the magnets of the row. As such, in some implementations the axial restraint ring 1312 may further include one or more clamp channels 1522. For example, a clamp channel 1522 may be formed in a support surface 1524 of the body 1502 of each of the two or more ring restraint segments 1402, 1404. The clamp channels 1522 of neighboring ring restraint segments align to cooperatively forming a continuous circumferential clamp channel that extends the interior circumference of the axial restraint ring 1312. Further, the band clamp 1520 typically includes one or more tightening mechanisms that have a profile or thickness that is greater than the band portion of the band clamp. Accordingly, one or more of the ring restraint segments 1402, 1404 may further be formed with one or more cavities to allow the axial restraint ring to be placed over the one or more tightening mechanism. Some implementations may further include one or more apertures within the body 1502 that align with the cavities to allow a user with access to the tightening mechanisms while the axial restraint ring is in position and on the one or more series of magnets.

Figure 18:
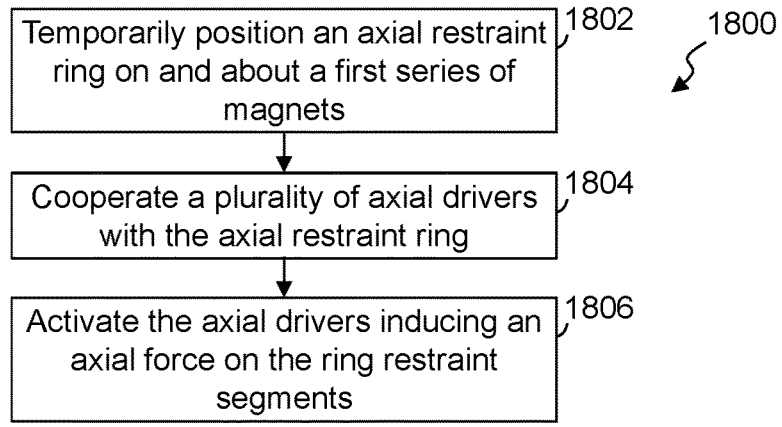
FIG. 18 shows a simplified flow diagram of an exemplary process of assembling a rotor, in accordance with some embodiments.

FIG. 18 shows a simplified flow diagram of an exemplary process 1800 of assembling a rotor, in accordance with some embodiments. In step 1802, an axial restraint ring 1312 is temporarily positioned on and about at least a first series 1307 of magnets positioned on an exterior surface of a rotor core 1302. Typically, the axial restraint ring comprises two or more ring restraint segments 1402, 1404 each comprising a body 1502, one or more shoulders 1504 extending from each of the bodies, and one or more flanges 1506 extending at an angle from an end of each of the one or more shoulders. Each of the one or more flanges includes an interior surface 1508 facing toward an interior of the hollow ring.

The ring restraint segments 1402, 1404 are cooperated to assemble the axial restraint ring. In cooperating the ring restraint segments, each of the ring restraint segments is secured with at least one other ring restraint segment securing together the two or more ring restraint segments about the first series of magnets forming the axial restraint ring about the first series of magnets. The cooperation between the ring restraint segments can include one or more bolts, latches, or the like extending through aligned bores in each of two adjacent ring restraint segments. Some embodiments further include recesses formed in the exterior sides of the ring restraint segments and corresponding to the bores to allow a user to insert the bolts between two segments and secure segments with a nut or other mechanism. Other methods of cooperating the ring restraint segments can be used.

In positioning the axial restraint ring, the ring restraint segments are positioned such that the interior surface 1508 of each of the flanges 1506 is in contact with an end 1316 of one or more magnets of the first series of magnets 1307. In some implementations, the ring restraint segments when cooperated together to form the axial restraint ring may not be in contact, and there may be a gap between neighboring segments with the coupling (e.g., bolt, latch, lever arm, etc.) extending across the gap between the neighboring segments.

In step 1804, a plurality of axial drivers are cooperated with the axial restraint ring. In some embodiments, the axial drivers extend through bores formed in the body 1502 of the ring restraint segments. Other methods of cooperating the axial drivers, such as eye hooks extending from the ring restraint segments, semicircular loops formed in the body, or other such structures. Alternatively or additionally, in some instances, one or more of the axial drivers may be cooperated with a coupling (e.g., a bolt) that couples together the one or more ring restraint segments.

The axial drivers are further cooperated with one or more anchors 1322, which are separate from the axial restraint ring and typically separated by a distance from the axial restraint ring. In some implementations, the anchor is an anchor ring that is positioned against and/or cooperated with a lip or extensions of the rotor core 1302 (or a stub shaft cooperated with an end of the rotor core, or other structure) that extend radially away from a central rotational axis of the rotor core. In other applications, the one or more anchors may be separate from the rotor core (e.g., on a wall, part of a rotor assembly system 100, or the like). In some embodiments, the anchor is formed of a ring, which may be formed from a single continuous ring, or formed from one or more anchor ring segments secured together (e.g., about a portion of the rotor core). The anchor can include bores, apertures or other features that allow the axial drivers to be cooperated with the anchor ring. For example, the anchor ring may include a plurality of bores such at least one bore aligns with each of a corresponding bore formed in the body 1502 of the axial restraint ring 1312 and with which an axial driver is cooperated.

In step 1806, the plurality of axial drivers are activated to induce an axial force on the ring restraint segments that is substantially parallel with the central axis of the hollow ring and a longitudinal axis of the rotor core. Further, the activation of the axial drivers induces the axial force toward the one or more anchors. The axial force is transferred through the body 1502, shoulders 1504 and the one or more flanges 1506 and applied by the interior surfaces 1508 onto the ends 1316 of each of the magnets of the series of magnets 1307 in an attempt to at least limit or inhibit movement of the magnets at least in an axial direction parallel with the longitudinal axis of the rotor core. Further, the axial force attempts to at least temporarily maintain an axial position of each of the magnets of the first series of magnets.

With the axial restraint ring 1312 positioned on a first series of magnets, a second series of magnets can be positioned on the rotor core and adjacent the first series of magnets. Multiple magnets of the second series of magnets can be sequentially and circumferentially positioned adjacent one or more magnets of the first series of magnets such that the one or more flanges are between the magnets of the first series of magnets and the magnets of the second series of magnets. Again, the second series of magnets are positioned on the rotor core while the plurality of axial drivers are activated and the axial force is transferred to the magnets of the first series of magnets maintaining at least an axial position of the magnets of the first series of magnets while the second series of magnets are positioned adjacent the first series of magnets.

As described above, in some embodiments, the magnets are positioned on the rotor core using the magnet gripper system 104. In some embodiments, for each magnet of the second series of magnets being positioned on the rotor core, the magnet gripper system, gripping a first magnet, is aligned with an intended position for the first magnet on the rotor core proximate the first series of magnets. The magnet gripper system is then moved such that the magnet becomes magnetically cooperated with the exterior surface of the rotor core while the magnet gripper resists magnetic forces applied at least on the first magnet by one or more magnets at least the first series of magnets, and while the axial force is applied by the interior surfaces of the one or more flanges onto the ends of each of the magnets of the first series of magnets in at least temporarily maintaining the axial position of each of the magnets of the first series of magnets and resisting at least axial magnetic forces applied by at least the first magnet on one or more of the magnets of the first series of magnets.

As described above, some magnets (e.g., rare earth magnets) can generate relatively high magnetic forces when handled near certain magnetic materials such as iron, steel, other magnets, and the like. These forces in some instances can approach hundreds of pounds and may result in injury or damage if not properly constrained. The use of the magnet gripper system and axial restraint system 1310, and other devices and systems help in controlling the magnet handling and placement during rotor assembly processes. This tooling provides the ability to accurately locate each magnet on the rotor core. Without accurate location at installation, tolerance build up can occur which may prevent the proper positioning of subsequent magnets and result in uneven spacing. In some implementations, devices and/or tooling can also help prevent unwanted magnet motion due to magnetic forces between magnets.

Again referring to FIG. 1, a rotor core 102 can be cooperated with and/or positioned adjacent the exemplary rotor assembly system 100, such as placed on rotor support stands that support the rotor and allow the rotor core 102 (and in some instances stub shafts cooperated with the rotor core at ends of the rotor core) to be rotated enabling accurate alignment during each magnet placement. The rotor assembly system can include one or more positioning systems (e.g., longitudinal slide system 108, cross slide system 110, vertical positioning slide system 106) that provides for accurate positioning of the magnet gripper system 104 relative to a rotor core 102. One or more hand cranks, screw driven slide assemblies, servomotors, indexing systems, control circuitry and the like may be included to provide constrained, positioning movement during magnet installation.

The magnet gripper system secures a magnet for manipulation and in part overcomes magnetic attractive and/or repulsion forces in a controlled manner during the installation. The magnet gripper system utilizes two or more slide plates that extend along sides and/or ends of the magnet to aid in securing the magnet. Some embodiments include a side plate control lever arm 610 that positions the two or more slide plates that align and gripping the magnet. In some implementations, at least one slide plate is extended along each side and end of the magnet when cooperated with the magnet gripper system (e.g., four slide plates when the magnet is generally rectangular in shape). The clamping system clamps and secures the side plates. For example, some embodiments include clamping handles 506 to control the clamping.

Referring back to at least FIGS. 13 and 16, in some implementations an assembly clamping ring 1330 can at least temporarily be secured about the rotor core 1302 a predefined distance from the axial restraint ring 1312 (or end of the rotor core when a first row of magnets are being positioned), which typically is directly dependent on the length of the magnets to be placed in a row and any spacers that may be utilized. Similar to the axial restraint ring, the assembly clamping ring 1330 can be formed for multiple segments secured together forming the ring around the rotor core. The assembly clamping ring can be configured to induce a compression force on the rotor core in attempts to prevent movement of the assembly clamping ring while magnets are being positioned between the axial restraint ring and the assembly clamping ring. In some implementations, the assembly clamping ring is made of material that is not magnetically attractive.

Once a magnet is placed on the rotor core some embodiments utilize temporary restraints, clamping or the like to maintain positioning of the magnets while subsequent magnets are placed. For example, in some applications, one or more magnet bridges can temporarily be secured across the magnets while the some or all of the magnets of a row are being placed.

Figure 19:
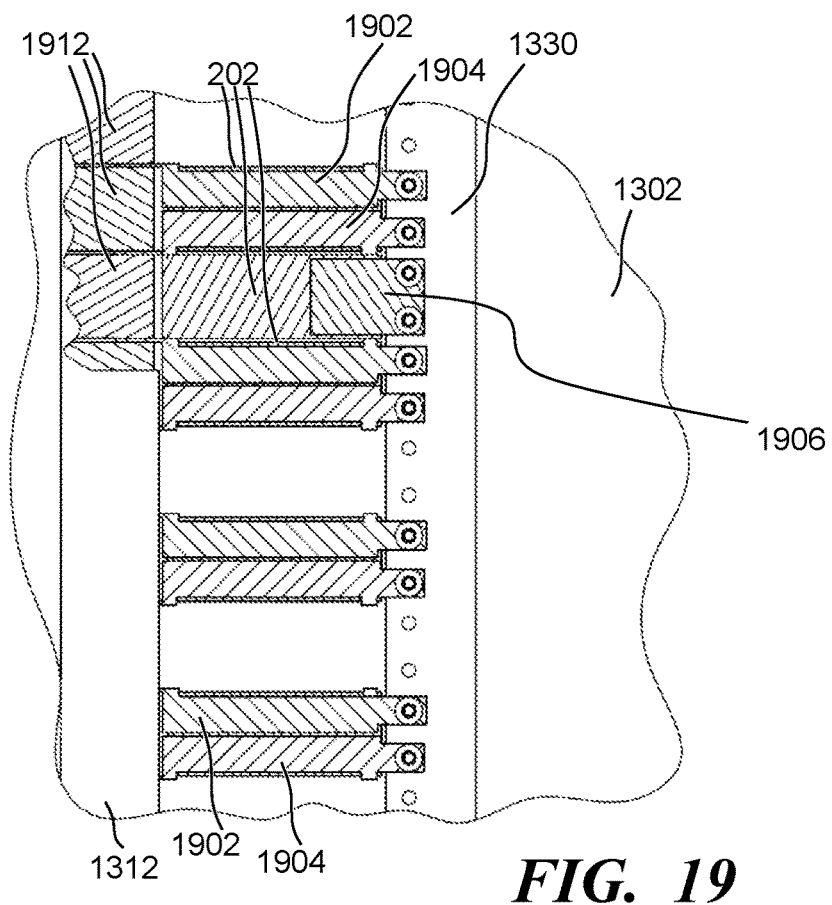
FIG. 19 shows a plane view of a portion of a rotor core, axial restraint ring positioned about the rotor core, an assembly clamping ring, and multiple magnets positioned on the rotor core, in accordance with some embodiment.

FIG. 19 shows a plane view of a portion of a rotor core 1302, axial restraint ring 1312 positioned about the rotor core, an assembly clamping ring 1330, and multiple magnets 202 positioned on the rotor core, in accordance with some embodiment. Further, one or more magnet bridges 1902, 1904 are placed over the magnets extending between the axial restraint ring 1312 and the assembly clamping ring 1330. Again, the axial restraint ring 1312 is typically positioned about a previous row of magnets 1912 (visible in FIG. 19 through the cut-away view of the axial restraint ring).

Figure 20:
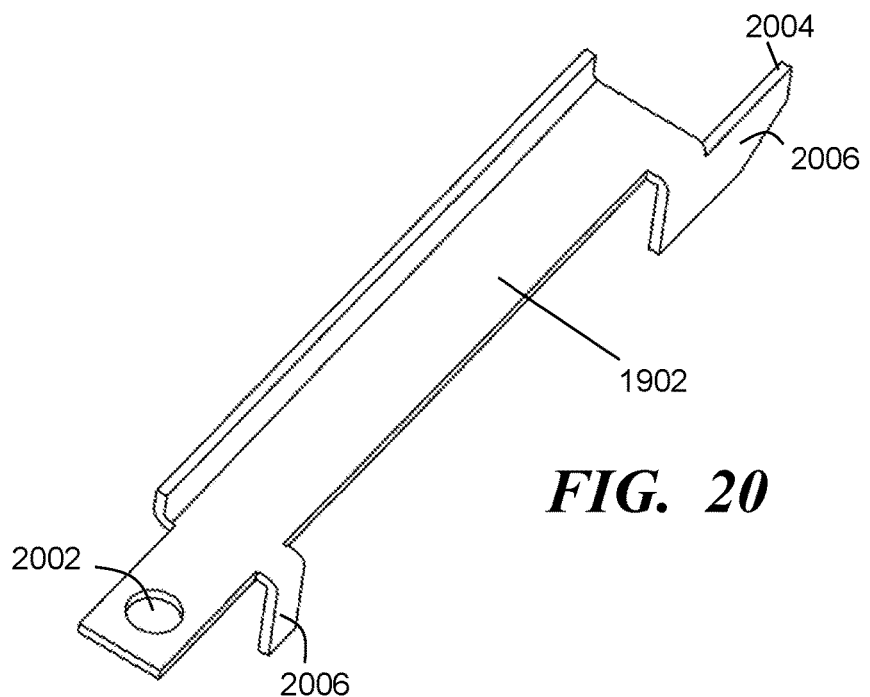
FIGS. 20 and 21 illustrate perspective views of exemplary magnet bridges, in accordance with some embodiments.
Figure 21:
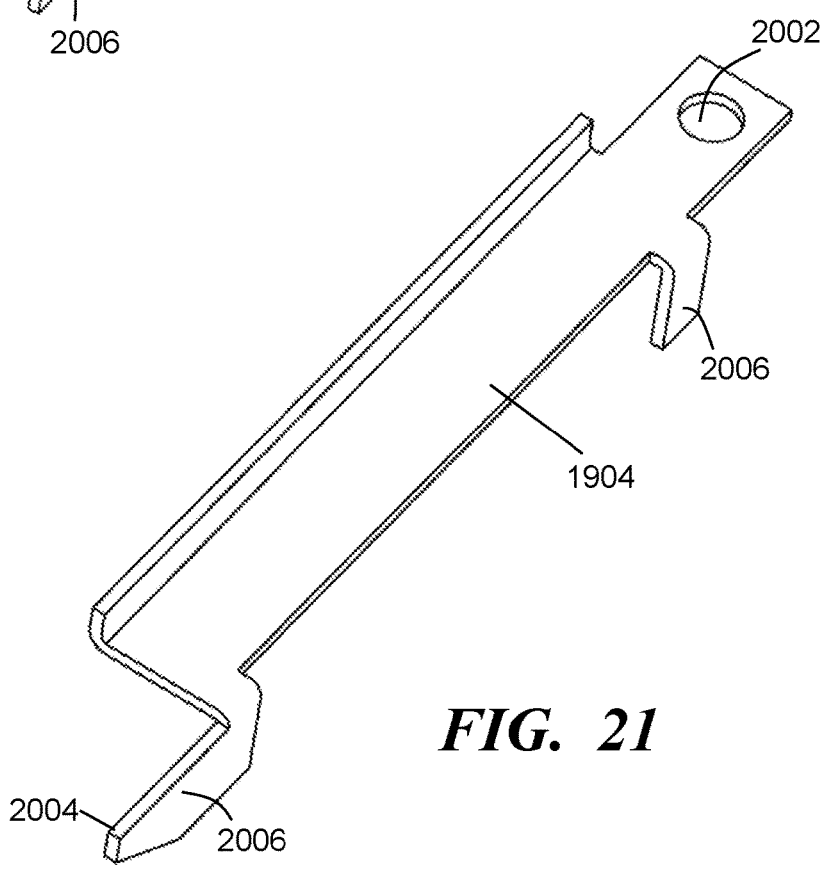

FIGS. 20 and 21 illustrate perspective views of exemplary magnet bridges 1902, 1904, respectively, in accordance with some embodiments. Once a magnet is positioned on the rotor core one or more of the magnet bridges can be secured with one or both of the assembly clamping ring and axial restraint ring. For example, the one end of the magnet bridge includes an aperture that can align with a screw hole 2002 in the assembly clamping ring to be temporarily secured with a screw. A slide end 2004 that can cooperate with the axial restraint ring (e.g., by sliding under a flange 1506 and/or between two flange segments and under a shoulder 1504. The magnet bridge may further include side tabs 2006 configured to extend along one or more sides of the magnet, and in some instances in the space between magnets of adjacent rows. As such, in some implementations, the magnet bridges 1902, 1904 fit on the magnets 202 with the slide end sliding under the axial restraint ring, and some instances between magnets 1912 in the previously placed row. The magnet bridges, in part help to restrain lateral motion of the magnets 202 being installed, and in some applications can also help in aligning the magnets with the previously installed row of magnets 1912.

Additionally or alternatively, the positioning of some of the magnets may be maintained with the application of a magnet clip 1906 that is secured with and extends from the assembly clamping ring. In some instances, the magnet clip does not extend the length of the magnet nor extend between the assembly clamping ring and the axial restraint ring.

Figure 22:
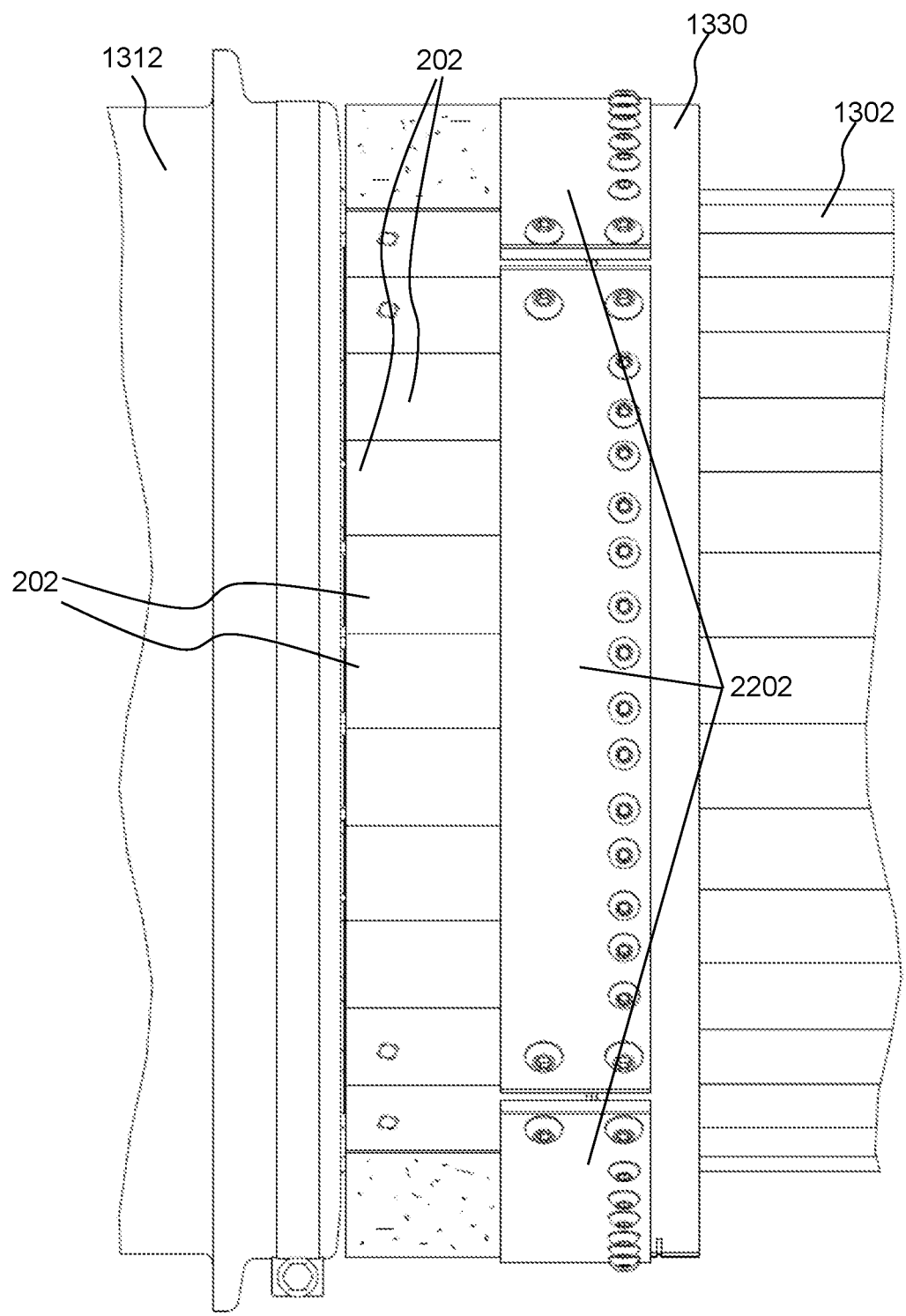
FIG. 22 illustrates a simplified plane view of a portion of a rotor core, axial restraint ring positioned about the rotor core, an assembly clamping ring, multiple magnets of a segment of magnets and a magnet segment strap, in accordance with some embodiment.

In some implementation magnets are installed in segments or groups (e.g., 6 to 8 magnet groups). After the group of magnets are installed, one or more of the magnet bridges 1902, 1904 and magnet clips 1906 may be replaced with one or more magnet segment straps. FIG. 22 illustrates a simplified plane view of a portion of a rotor core 1302, axial restraint ring 1312 positioned about the rotor core, an assembly clamping ring 1330, multiple magnets 202 of a segment of magnets and a magnet segment strap 2202, in accordance with some embodiment. The magnet segment strap is at least temporarily secured with the assembly clamping ring 1330 (e.g., with one or more screws), and can extend over at least a portion of a length of the magnets of the segment. In some implementations one or more a non-magnetic blocks (e.g., stainless steel magnet block) can be placed on opposite sides of each segment of magnets.

Further, in some instances, the non-magnetic blocks at each end of a segment of magnets may have taped holes for attaching the segment strap.

The magnet segment strap can be formed from a metal, plastic or other rigid material. Further, the magnet segment strap is typically formed with a curvature that is consistent with the expected curvature of the segment of magnets and/or the assembly clamping ring. Further, in some implementations, prior to removing the magnet bridges the magnet bridges can be loosened and a band clamp inserted underneath and around the rotor core (one or more spacers may be positioned around the rotor core if not all of the magnets have been placed) and tightened to hold the magnets at least while the magnet segment strap is applied.

Some embodiments enable the precision installation of high magnetic force permanent magnets on a magnetic rotor with or without mechanical features on the rotor to secure the magnet positions. Magnets can be positioned on the rotor core (e.g., located on flats of an exterior surface on the rotor core). Further, some embodiments secure previously positioned magnets to prevent further motion while subsequent magnets are installed.

As described above, some embodiments include one or more control systems to aid in and/or automate the cooperation of the magnet with the magnet gripper system and/or the placement of a magnet on the rotor core. The one or more control systems can communicate with one or more motors, sensors and the like to track precise positioning and alignment. The control systems can be implemented through one or more computers, processors, microprocessors, and one or more computer and/or processor readable memory By way of example, the control system may comprise a control circuit, memory, a user interface, and an input/output (I/O) interface providing any type of wired and/or wireless connectivity to the control system. Internal communications between components can be provided through coupled to a communication bus to allow data and signaling to pass therebetween. In some instances, the control circuit and the memory may be referred to as a control unit. The functionality of the control system will depend on the programming stored in the memory. The control system may be implemented through one or more the central computer system, while in other instances may be implemented through separate control systems. Again, one or more sensors (e.g., index sensors, distance measurement sensors, force and/or pressure sensors, and other such sensors) may provide feedback to the control system to aid the control system in accurate operation.

While the invention herein disclosed has been described by means of specific embodiments, examples and applications thereof, numerous modifications and variations could be made thereto by those skilled in the art without departing from the scope of the invention set forth in the claims.

What is claimed is:

1. A magnet gripper system, comprising:
a gripper base comprising a magnetically attractive face;
at least two slide plate retaining systems rigidly fixed relative to the gripper base positioned on lateral sides relative to the gripper base and separated by at least a width of the gripper base;
two or more slide plates wherein at least one of the slide plates is movably cooperated with each of the at least two slide plate retaining systems such that the slide plates are configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position; and at least one push rod comprising a non-magnetically attractive end positioned relative to the gripper base and movable between a rod retracted position and a rod extended position such that in the rod extended position the non-magnetically attractive end extends beyond the face of the gripper base interfering with magnetically attaching with the face of the gripper base, and in the rod retracted position does not interfere with magnetically coupling with the face of the gripper base.

2. The magnet gripper system of claim 1, wherein at least two of the two or more slide plates are spaced apart when in the extended position and each configured to extend along opposite lateral sides of a magnet when the magnet is cooperated with the gripper base.

3. The magnet gripper system of claim 2, wherein the at least two slide plate retaining systems retain the slide plates such that the slide plates slide at an angle toward each other when moved toward the extended position and such that ends of the slide plates distal from the slide plate retraining systems are closer together when in the extended position than when the slide plates are in the retracted position.

4. The magnet gripper system of claim 1, further comprising:

a slide plate clamp system secured relative to the gripper base and configured to transition between a release state and a clamping state, the slide plate clamp system when in the clamping state induces a compression force on each of the slide plates in a direction toward the gripper base pinning the slide plates in position and inhibiting movement of the slide plates, and when in the release state releases the compression force and allows movement of the slide plates.

5. The magnet gripper system of claim 1, further comprising:

a push rod control system coupled with multiple push rods including the at least one push rod, wherein the push rod control system comprising gearing that cooperates with the multiple push rods and mechanically synchronizes an extension and retraction of the multiple push rods.

6. The magnet gripper system of claim 1, wherein the gripper base further comprises one or more guide pin channels, wherein the guide pin channels are configured to mate with corresponding one or more guide pins of a separate magnet cradle establishing accurate alignment of the gripper base and the two or more slide plates relative to the magnet cradle.

7. A magnet gripper system, comprising:

a gripper base comprising a magnetically attractive face;

at least two slide plate retaining systems rigidly fixed relative to the gripper base positioned on lateral sides relative to the gripper base and separated by at least a width of the gripper base;

two or more slide plates wherein at least one of the slide plates is movably cooperated with each of the at least two slide plate retaining systems such that the slide plates are configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position; and a vertical positioning slide system comprising one or more guides, and a stop support cooperated with each of the one or more guides; and a frame secured with the gripper base and further cooperated with the one or more guides such that the gripper base is free to move vertically along the one or more guides between the one or more stop supports and an upper bound, and when the frame is in contact with the one or more stop supports, the one or more stop supports support a weight of at least the frame, gripper base, the at least two slide plate retaining systems and the corresponding slide plates.

8. The magnet gripper system of claim 7, wherein the vertical positioning slide system further comprises a vertical control system coupled with each of the one or more guides and controls a vertical position of the one or more stop supports cooperated with the one or more guides.

9. The magnet gripper system of claim 7, further comprising:

at least one push rod comprising a non-magnetically attractive end positioned relative to the gripper base and movable between a rod retracted position and a rod extended position such that in the rod extended position a distal end of the at least one push rod extends beyond the face of the gripper base interfering with magnetically attaching with the face of the gripper base, and in the rod retracted position does not interfere with magnetically coupling with the face of the gripper base.

10. The magnet gripper system of claim 9, further comprising:

a push rod control system coupled with multiple push rods including the at least one push rod, wherein the push rod control system comprising gearing that cooperates with the multiple push rods and mechanically synchronizes an extension and retraction of the multiple push rods.

11. The magnet gripper system of claim 7, wherein the gripper base further comprises one or more guide pin channels, wherein the guide pin channels are configured to mate with corresponding one or more guide pins of a separate magnet cradle establishing accurate alignment of the gripper base and the two or more slide plates relative to the magnet cradle.

12. The magnet gripper system of claim 7, wherein at least two of the two or more slide plates are spaced apart when in the extended position.

13. The magnet gripper system of claim 12, wherein the at least two slide plate retaining systems retain the slide plates such that the slide plates slide at an angle toward each other when moved toward the extended position and such that ends of the slide plates distal from the slide plate retraining systems are closer together when in the extended position than when the slide plates are in the retracted position.

14. The magnet gripper system of claim 7, further comprising:

a slide plate clamp system secured relative to the gripper base and configured to transition between a release state and a clamping state, the slide plate clamp system when in the clamping state induces a compression force on each of the slide plates in a direction toward the gripper base pinning the slide plates in position and inhibiting movement of the slide plates, and when in the release state releases the compression force and allows movement of the slide plates.

15. The magnet gripper system of claim 14, wherein at least two of the two or more slide plates are spaced apart when in the extended position.

16. The magnet gripper system of claim 15, wherein the at least two slide plate retaining systems retain the slide plates such that the slide plates slide at an angle toward each other when moved toward the extended position and such that ends of the slide plates distal from the slide plate retraining systems are closer together when in the extended position than when the slide plates are in the retracted position.

17. A magnet gripper system, comprising:
a gripper base comprising a magnetically attractive face;
at least two slide plate retaining systems rigidly fixed relative to the gripper base positioned on lateral sides relative to the gripper base and separated by at least a width of the gripper base;
two or more slide plates wherein at least one of the slide plates is movably cooperated with each of the at least two slide plate retaining systems such that the slide plates are configured to move between a retracted position with the slide plates retracted relative to the face of the gripper base and an extended position with the slide plates extended relative to the face of the gripper base with an end of each of the slide plates being positioned further from the face of the gripper base when in the extended position than when the slide plates are in the retracted position; and
a magnet cradle;
wherein the gripper base further comprises one or more guide pin channels, wherein each of the one or more guide pin channels is configured to mate with a corresponding one of one or more guide pins of the magnet cradle and configured to establish accurate alignment of the gripper base and the two or more slide plates relative to the magnet cradle;
wherein the magnet cradle comprises:
a non-magnetic cradle frame;
the one or more guide pins extending from the cradle frame; and
one or more magnet latches cooperated with the cradle frame and configured to transition from a latched state and an unlatched state.

18. The magnet gripper system of claim 17, further comprising:
at least one push rod comprising a non-magnetically attractive end positioned relative to the gripper base and movable between a rod retracted position and a rod extended position such that in the rod extended position a distal end of the at least one push rod extends beyond the face of the gripper base interfering with magnetically attaching with the face of the gripper base, and in the rod retracted position does not interfere with magnetically coupling with the face of the gripper base.

19. The magnet gripper system of claim 18, further comprising:
a push rod control system coupled with multiple push rods including the at least one push rod, wherein the push rod control system comprising gearing that cooperates with the multiple push rods and mechanically synchronizes an extension and retraction of the multiple push rods.

20. The magnet gripper system of claim 17, further comprising:
a vertical positioning slide system comprising one or more guides, and a stop support cooperated with each of the one or more guides; and
a frame secured with the gripper base and further cooperated with the one or more guides such that the gripper base is free to move vertically along the one or more guides between the one or more stop supports and an upper bound, and when the frame is in contact with the one or more stop supports, the one or more stop supports support a weight of at least the frame, gripper base, the at least two slide plate retaining systems and the corresponding slide plates.

21. The magnet gripper system of claim 20, wherein the vertical positioning slide system further comprises a vertical control system coupled with each of the one or more guides and controls a vertical position of the one or more stop supports cooperated with the one or more guides.

22. The magnet gripper system of claim 17, wherein at least two of the two or more slide plates are spaced apart when in the extended position.

23. The magnet gripper system of claim 22, wherein the at least two slide plate retaining systems retain the slide plates such that the slide plates slide at an angle toward each other when moved toward the extended position and such that ends of the slide plates distal from the slide plate retraining systems are closer together when in the extended position than when the slide plates are in the retracted position.

24. The magnet gripper system of claim 17, further comprising:
a slide plate clamp system secured relative to the gripper base and configured to transition between a release state and a clamping state, the slide plate clamp system when in the clamping state induces a compression force on each of the slide plates in a direction toward the gripper base pinning the slide plates in position and inhibiting movement of the slide plates, and when in the release state releases the compression force and allows movement of the slide plates.

25. The magnet gripper system of claim 24, wherein at least two of the two or more slide plates are spaced apart when in the extended position.

26. The magnet gripper system of claim 25, wherein the at least two slide plate retaining systems retain the slide plates such that the slide plates slide at an angle toward each other when moved toward the extended position and such that ends of the slide plates distal from the slide plate retraining systems are closer together when in the extended position than when the slide plates are in the retracted position.

* * * * *